US012528294B2

(12) United States Patent
Nose et al.

(10) Patent No.: US 12,528,294 B2
(45) Date of Patent: Jan. 20, 2026

(54) LIQUID EJECTION DEVICE

(71) Applicant: SEIKO EPSON CORPORATION, Tokyo (JP)

(72) Inventors: Hiroshi Nose, Shiojiri (JP); Tomoji Suzuki, Matsumoto (JP); Manabu Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 225 days.

(21) Appl. No.: 18/529,561

(22) Filed: Dec. 5, 2023

(65) Prior Publication Data

US 2024/0190133 A1 Jun. 13, 2024

(30) Foreign Application Priority Data

Dec. 7, 2022 (JP) ................................ 2022-195525
Dec. 7, 2022 (JP) ................................ 2022-195526

(51) Int. Cl.
*B41J 2/165* (2006.01)

(52) U.S. Cl.
CPC ....... *B41J 2/16523* (2013.01); *B41J 2/16508* (2013.01); *B41J 2/16552* (2013.01); *B41J 2/16588* (2013.01)

(58) Field of Classification Search
CPC ................ B41J 2/16523; B41J 2/16508; B41J 2/16552; B41J 2/16588
See application file for complete search history.

(56) References Cited

U.S. PATENT DOCUMENTS

2014/0292924 A1 10/2014 Ichihara et al.

FOREIGN PATENT DOCUMENTS

| | | | | | |
|---|---|---|---|---|---|
| CN | 116265252 A | * | 6/2023 | .......... B41J 2/16508 |
| CN | 118144427 A | * | 6/2024 | ............ B41J 2/1721 |
| JP | 2005-119139 A | | 5/2005 | |
| JP | 2010-042592 A | | 2/2010 | |
| JP | 2014-188787 A | | 10/2014 | |
| JP | 2023-089491 A | | 6/2023 | |
| JP | 2023089492 A | * | 6/2023 | |

* cited by examiner

*Primary Examiner* — Sharon Polk
(74) *Attorney, Agent, or Firm* — WORKMAN NYDEGGER

(57) ABSTRACT

A liquid ejection device includes a base section, a liquid ejection section that ejects ink from nozzles onto a medium, a liquid receiving section that receives ink ejected as waste liquid from the nozzle, an ejection section movement mechanism that holds the ejection section and the liquid receiving section movably, and a liquid tray that is provided below the liquid receiving section and receives ink discharged from the liquid receiving section, wherein the ejection section movement mechanism can move the liquid ejection section and the liquid receiving section in the depth direction and can also move the liquid ejection section in a scanning direction that intersects the depth direction, the liquid receiving section is located below the liquid ejection section as viewed from the direction along the scanning direction, and the liquid tray is located spanning the depth direction of the movement area in which the liquid receiving section moves.

10 Claims, 16 Drawing Sheets

LIQUID EJECTION DEVICE

The present application is based on, and claims priority from JP Application Serial Numbers 2022-195525, filed Dec. 7, 2022, and 2022-195526, filed Dec. 7, 2022, the disclosures of which are hereby incorporated by reference herein in their entirety.

BACKGROUND

1. Technical Field

The present disclosure relates to a liquid ejection device.

2. Related Art

JP-A-2005-119139 discloses a liquid droplet ejection device for ejecting functional liquid droplets from nozzles of a functional liquid droplet ejection head to a workpiece. The functional liquid droplet is an example of a liquid, the functional liquid droplet ejection head is an example of a liquid ejection section, and the liquid droplet ejection device is an example of a liquid ejection device. The ejection of the functional liquid droplets onto the workpiece is performed by moving the functional liquid droplet ejection head in the sub-scanning direction, which is orthogonal to the main scanning direction, with respect to the workpiece on the workpiece table, which is moving in the main scanning direction. The main scanning direction is an example of a depth direction, and the sub-scanning direction is an example of a scanning direction. The workpiece is an example of a medium, and the work table is an example of a medium support section. It is also disclosed that the liquid droplet ejection device has a flushing box that receives functional liquid droplets ejected from the functional liquid droplet ejection head for function recovery of the functional liquid droplet ejection head. The flushing box is an example of a liquid receiving section. It is also disclosed that the flushing box is provided in the work table to extend over the sub-scanning direction, and that an absorbing member is laid inside the flushing box.

However, when the flushing box is provided spanning the sub-scanning direction, as in JP-A-2005-119139, the absorbing member is also provided spanning the sub-scanning direction. If the size of the work piece is uneven, the region where the flushing box receives functional liquid droplets is also likely to be uneven. That is, regions in which the amount of receiving functional liquid droplets is small are likely to occur in the absorbing member. In the regions where the amount of receiving functional liquid droplets is small, the ejected functional liquid droplets will dry and harden on the absorbing member. As a result, the flushing box may not be able to properly receive the ejected functional liquid droplets.

SUMMARY

A liquid ejection device includes a base section; a liquid ejection section that performs printing by ejecting liquid from nozzles onto a medium; a liquid receiving section having an absorbing member that receives liquid that was ejected as waste liquid from the nozzles; an ejection section movement mechanism that is provided in the base section, and that movably holds the liquid ejection section and the liquid receiving section; a medium support section that is provided on the base section, and that supports the medium in a print area where the liquid ejection section performs printing; and a liquid tray that is provided below the liquid receiving section, and that is configured to receive liquid discharged from the liquid receiving section, wherein the ejection section movement mechanism is configured to move the liquid ejection section and the liquid receiving section across a depth direction of the print area, and to move the liquid ejection section in a scanning direction that intersects the depth direction, the liquid receiving section is provided at a position below the liquid ejection section as viewed from a direction along the scanning direction, and the liquid tray is provided spanning the depth direction of a movement area in which the liquid receiving section moves.

DESCRIPTION OF EMBODIMENTS

Hereinafter, the present disclosure will be described based on embodiments. In each figure, the same symbol is used for the same members, and redundant explanations are omitted. Note that in this specification, “same”, “identical”, and “simultaneous” do not refer only to being exactly the same. For example, in this specification, “same”, “identical”, and "simultaneous" shall include cases where they are the same taking into account measurement error.

For example, in this specification, "same", "identical", and "simultaneous" shall include cases where they are the same, taking into account manufacturing variations of members. Also, for example, in this specification, "same", "identical", and "simultaneous" shall include cases where they are the same without loss of function. Thus, for example, "both dimensions are the same" means that a dimensional difference between the two is within +5%, and especially preferably within +3% of one of the dimensions, taking account measurement errors and manufacturing variations of the members.

In each figure, X, Y, and Z represents three spatial axes that are orthogonal to each other. In this specification, directions along these axes are an X axis direction, a Y axis direction, and a Z axis direction. When specifying the direction, a positive direction is denoted by "+" and a negative direction is denoted by "−". The positive and negative signs are used together in the direction notation, and the direction to which the arrow in each figure is pointing is described as the + direction and the direction opposite to the arrow is described as the − direction.

The Z axis direction indicates the gravity direction, the +Z direction indicates the vertical downward direction, and the −Z direction indicates the vertical upward direction. A plane containing the X and Y axes is described as an X-Y plane, a plane containing the X and Z axes is described as an X-Z plane, and a plane containing the Y and Z axes is described as a Y-Z plane. The X-Y plane is a horizontal plane. Then, the three X, Y, and Z spatial axes, which do not limit the positive and negative directions, are described as the X axis, the Y axis, and the Z axis.

1. First Embodiment

In this embodiment, a liquid ejection device 100 is configured as an inkjet printer, and ejects ink onto the medium M to form an image. The ink is an example of liquid. The medium M is not limited to paper, and may be a plastic film, a plate member, a rigid panel, a corrugated board, or the like, or may be clothes such as a cloth or a T-shirt.

Figure 1:
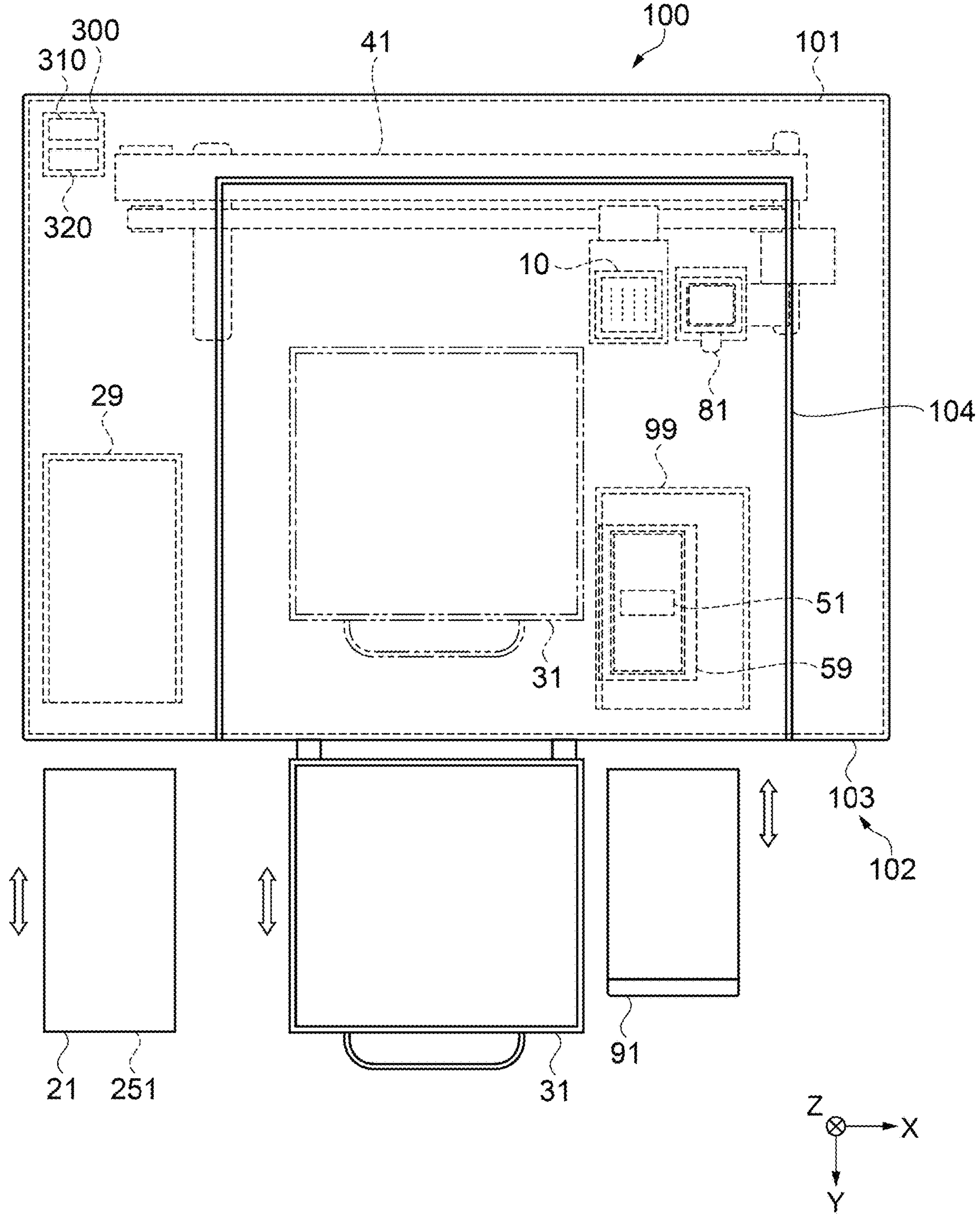
FIG. 1 is a schematic plan view illustrating an appearance of a liquid ejection device according to an embodiment of the present disclosure.
Figure 2:
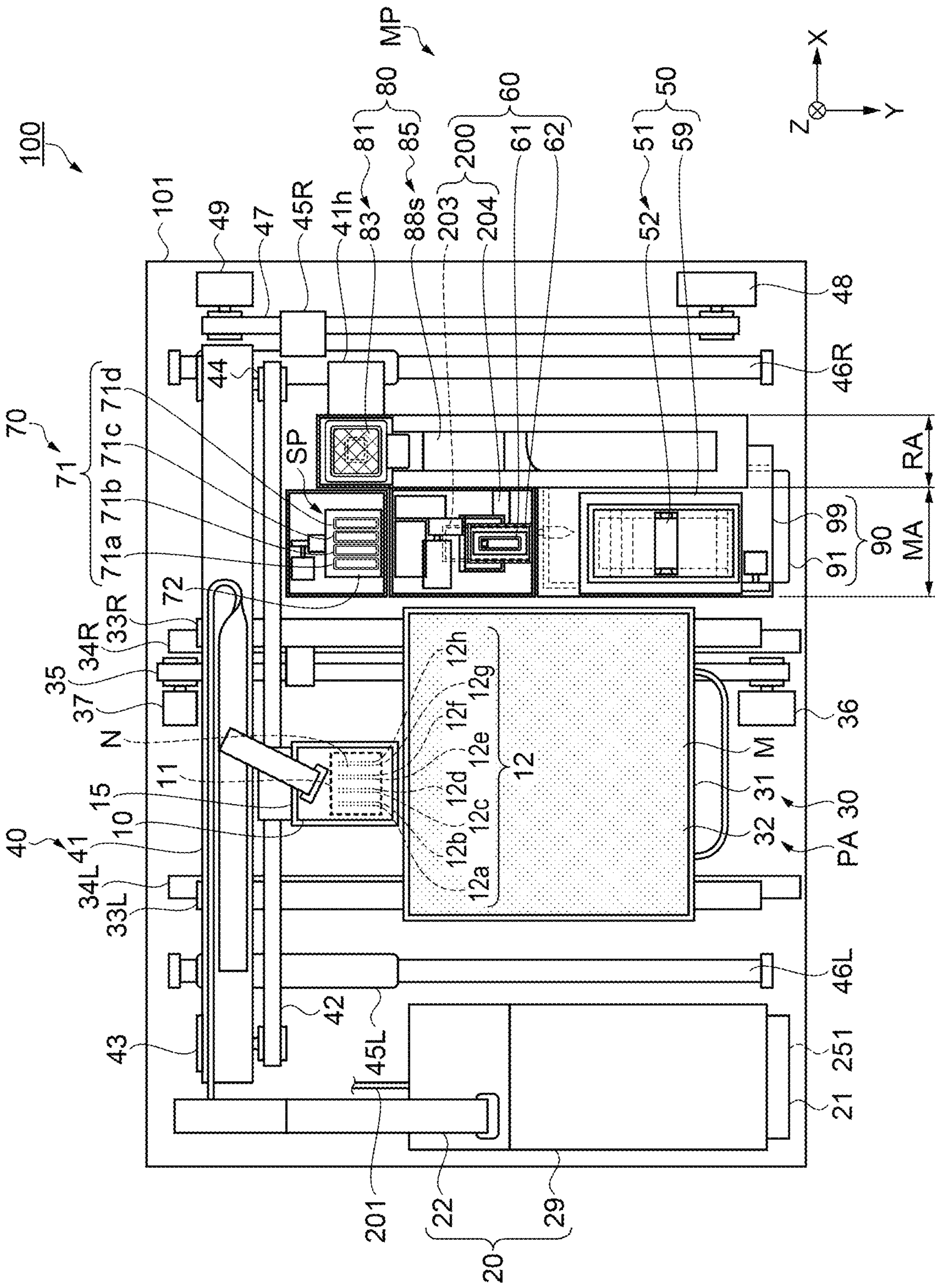
FIG. 2 is a schematic plan view illustrating a schematic configuration of the liquid ejection device.

As illustrated in FIGS. 1 and 2, the liquid ejection device 100 is equipped with a flat plate-shaped base section 101, an outer member 102, and an upper cover 104 that form a rectangular box-shaped housing. The upper cover 104 is attached to the outer member 102 so that it can be in an open state, which allows access to inside of the housing, and in a closed state. In the housing, the liquid ejection device 100 is equipped with a liquid ejection section 10, an ink supply section 20, a medium support mechanism 30, an ejection section movement mechanism 40, a maintenance section MP, and a control section 300.

As illustrated in FIG. 2, the liquid ejection section 10 has a nozzle surface 11 with a plurality of nozzle arrays 12 that eject ink in the +Z direction. The liquid ejection section 10 is mounted on a carriage 15 (to be described later) with the nozzle surface 11 being in an orientation along the X-Y plane.

The nozzle array 12 is formed by a plurality of nozzles N aligned in the Y axis direction. In a print area PA, the liquid ejection section 10 ejects ink onto a medium in the +Z direction from the plurality of nozzles N comprising the nozzle array 12 to perform printing by driving and controlling ejection elements (not shown). In this embodiment, the plurality of nozzle arrays 12 includes nozzle arrays 12*a*, 12*b*, 12*c*, 12*d*, 12*e*, 12*f*, 12*g*, and 12*h*.

In this embodiment, a total of five colors of ink, that is, black, cyan, magenta, yellow, and white, are ejected from the nozzles N. The inks ejected from eight nozzle arrays 12*a* to 12*h*. For example, the black ink is ejected from the nozzle array 12*f*, the cyan ink is ejected from the nozzle array 12*c*, the magenta ink is ejected from the nozzle array 12*d*, and the yellow ink is ejected from the nozzle array 12*e*. The white ink is ejected from the nozzle arrays 12*a*, 12*b*, 12*g*, and 12*h*. Alternatively, the white ink may be ejected from the nozzle arrays 12*a* and 12*b*. In this case, the nozzle arrays 12*g* and 12*h* are not used. Note that not limited to the above five colors, ink of any color such as light cyan, light magenta, or gray may be ejected from the nozzle arrays 12*a* to 12*h*.

The medium support mechanism 30 supports a medium M in the print area PA where the liquid ejection section 10 performs printing on the medium M. The medium support mechanism 30 has a medium support section 31 that supports the medium M. The medium support section 31 has a medium support surface 32 that supports the medium M, and a pair of sliding sections 33L and 33R, which are spaced apart in the X axis direction.

The medium support mechanism 30 supports the medium support section 31, which is movable between a printing position shown in FIG. 2 and a set position shown in FIG. 1. The set position is a position where the medium M can be set on the medium support section 31. The printing position is a position when the liquid ejection section 10 performs printing on the medium M that is supported by the medium support section 31. Thus, in this embodiment, as illustrated in FIG. 2, the print area PA is an area of the medium support surface 32 of the medium support section 31 in the printing position as viewed from the −Z direction of the liquid ejection device 100. In FIG. 2, the print area PA is the area indicated by the dot pattern. The set position, which is in the +Y direction with respect to the printing position, is located further in the +Y direction than the front surface 103 of the outer member 102. FIG. 1 shows the medium support section 31 in the printing position with a two dot chain line.

The medium support mechanism 30 has a pair of guide rails 34L, 34R that slidably guide the sliding sections 33L, 33R of the medium support section 31 in the Y axis direction. The medium support mechanism 30 also has a transport belt 35 to which the sliding section 33R is fixed, a transport motor 36, and a pulley 37. The guide rails 34L and 34R are attached to the base section 101. Thus, the medium support section 31 is movably attached to the base section 101. The transport belt 35 is wound around the transport motor 36 and the pulley 37. When the transport motor 36 is driven and controlled, the transport belt 35 reciprocates in the Y axis direction.

When the transport motor 36 is driven and controlled, the medium support section 31, whose sliding section 33R is fixed to the transport belt 35, also reciprocates in the Y axis direction. As a result, the medium support section 31 can reciprocate in the Y axis direction between the printing position, where the medium support surface 32 is located in the print area PA, and the set position.

In addition to the carriage 15 described above, the ejection section movement mechanism 40 is equipped with a carriage support section 41, a transport belt 42, a movement motor 43, and a pulley 44. The carriage support section 41 has a pair of sliding sections 45L, 45R spaced apart in the X axis direction. The carriage 15 mounts the liquid ejection section 10 in a state where the nozzle surface 11 is along the X-Y plane and ink can be ejected from the nozzles N in the +Z direction. The carriage 15 is attached to the transport belt 42. The transport belt 42 is wound around the movement motor 43 and the pulley 44.

The ejection section movement mechanism 40 is equipped with a pair of guide shafts 45L, 45R that slidably guide the sliding sections 46L, 46R of the carriage support section 41 in the Y axis direction, a transport belt 47, a movement motor 48, and a pulley 49. The guide shafts 46L and 46R are attached to the base section 101. Thus, the ejection section movement mechanism 40 is provided in the base section 101. The sliding section 45R of the carriage support section 41 is attached to the transport belt 47. The transport belt 47 is wound around the movement motor 48 and the pulley 49.

By the movement motor 43 being driven and controlled, the transport belt 42 rotates forward and backward along the X axis direction. When the transport belt 42 reciprocates in the X axis direction, the carriage 15, which is attached to the transport belt 42, and the liquid ejection section 10, which is mounted on the carriage 15, also reciprocate in the X axis direction. The X axis direction is an example of a scanning direction. In this embodiment, the scanning directions are the +X direction and the −X direction.

Note that the carriage support section 41 is provided with a receiving section mounting section 41*h* to which a liquid receiving section 81 of a liquid reception section 80 (to be described later) is detachably attached. The receiving section mounting section 41*h* is located, in the scanning area where the liquid ejection section 10 mounted on the carriage 15 reciprocates in the X axis direction, at a position that is further in the +X direction than the print area PA in the X axis direction.

By the movement motor 48 being driven and controlled, the transport belt 47 rotates forward and backward along the Y axis direction. By the movement motor 48 being driven and controlled, the carriage support section 41, whose sliding section 45R is attached to the transport belt 47, also reciprocates in the Y axis direction. As a result, the carriage 15, which is attached to the carriage support section 41 via the transport belt 42, and the liquid ejection section 10, which is mounted on the carriage 15, also reciprocate in the Y axis direction. Thus, the liquid receiving section 81, which is attached to the receiving section mounting section 41*h* of the carriage support section 41, also reciprocates in the Y axis direction.

Therefore, the movement motor 43 and the movement motor 48 are driven and controlled to reciprocate the liquid ejection section 10 in the X axis direction and the Y axis direction. In other words, the ejection section movement mechanism 40 holds the liquid ejection section 10 so that it is movable in the X axis direction and the Y axis direction. This enables the liquid ejection section 10 to move above following areas; the print area PA, an area further on the −X direction than the print area PA in the X axis direction, and an area further on the +X direction than the print area PA in the X axis direction. Further, the liquid ejection section 10 can move over an area further on the −Y direction than the print area PA in the Y axis direction and an area further on the +Y direction than the print area PA in the Y axis direction.

The ink supply section 20 supplies ink to the liquid ejection section 10. The ink supply section 20 is equipped with a supply flow path 22 and a liquid container mounting section 29 in which a liquid container 21 and a washing liquid container 251 can be mounted. The liquid container mounting section 29 is an example of a mounting section. As illustrated in FIGS. 1 to 8, the liquid container mounting section 29 is attached to the base section 101. As illustrated in FIGS. 1 and 2, the liquid container mounting section 29 is provided in an area that is to the −X direction side of the print area PA in the X axis direction. In other words, the liquid container mounting section 29 is provided, in the X axis direction, in an area that is on the opposite side of a maintenance area MA (to be described later) with respect to the print area PA.

The liquid container mounting section 29 is provided so that the liquid container 21 can be attached to and detached from a front surface 103 of the outer member 102, which is the +Y direction side in the Y axis direction. The liquid container mounting section 29 in this embodiment has six mounting slots in which the liquid container 21 and the washing liquid container 251 can be attached to and detached from. The six mounting slots are aligned in the Z axis direction. The Y axis direction is an example of a depth direction of the base section 101. In this embodiment, the depth directions are the +Y direction and the −Y direction. The +Y direction side is an example of the front side of the base section 101 and the −Y direction side is an example of the back side of the base section 101.

Figure 15:
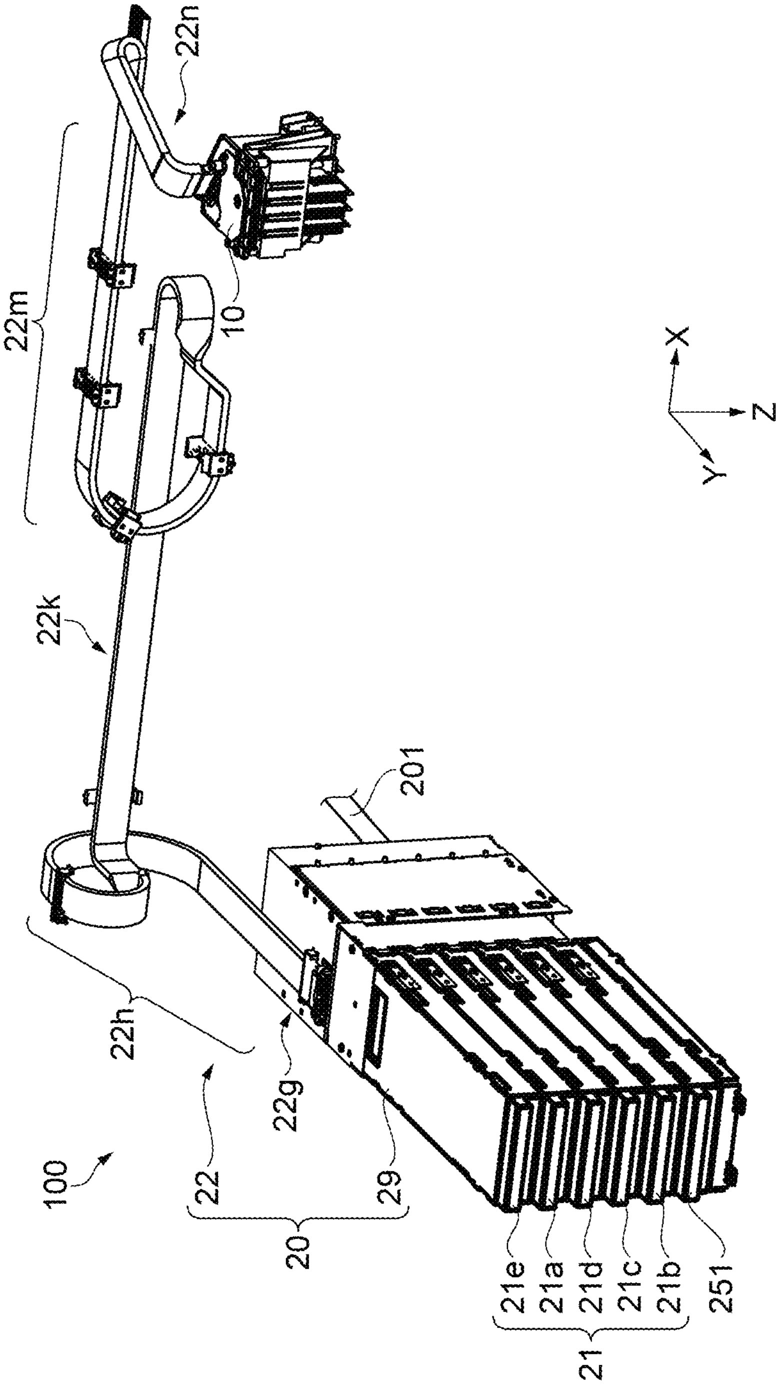
FIG. 15 is a perspective view illustrating a schematic configuration of an ink supply section.

In this embodiment, as illustrated in FIG. 15, a plurality of liquid containers 21 includes a liquid container 21*a* that contains black ink. The plurality of liquid containers 21 includes a liquid container 21*b* that contains cyan ink. The plurality of liquid containers 21 includes a liquid container 21*c* that contains magenta ink. The plurality of liquid containers 21 includes a liquid container 21*d* that contains yellow ink. The plurality of liquid containers 21 includes a liquid container 21*e* that contains white ink.

In this embodiment, in order from the +Z direction side, the washing liquid container 251, the liquid container 21*b*, the liquid container 21*c*, the liquid container 21*d*, the liquid container 21*a*, and the liquid container 21*e* are mounted in the liquid container mounting section 29 aligned in the Z axis direction.

The plurality of liquid containers 21 and the washing liquid container 251 in this embodiment are mounted side by side in the Z axis direction relative to the liquid container mounting section 29, but they may be mounted side by side in the X axis direction relative to the liquid container mounting section 29, for example. Although the liquid container 21 in this embodiment is a replaceable cartridge-type tank, it may also be a refillable tank with an injection section in which ink can be injected and an accommodation chamber that holds ink injected from the injection section. In this case, the ink supply section 20 includes the liquid containers 21 and the washing liquid container 251.

The supply flow path 22 connects the liquid container mounting section 29 to the liquid ejection section 10 so that the ink contained in the liquid container 21 mounted in the liquid container mounting section 29 flows toward the liquid ejection section 10. The supply flow path 22 connects the liquid container 21 mounted in the liquid container mounting section 29 to the liquid ejection section 10 provided in the carriage 15. The supply flow path 22 in this embodiment is formed, for example, of a flexible resin tube.

As illustrated in FIG. 15, the supply flow path 22 has an end portion 22*g*, which is the mounting section side, a first deformation portion 22*h*, an intermediate portion 22*k*, a second deformation portion 22*m*, and an end portion 22*n*, which is the ejecting section side. The end portion 22*g* of the mounting section side is a region that is fixed to the liquid container mounting section 29 so as to be connectable with the liquid container 21 that is mounted in the liquid container mounting section 29. The first deformation portion 22*h* is a region that can deform following the movement of the liquid ejection section 10, which is attached to the carriage support section 41 via the carriage 15, in the Y axis direction. The first deformation portion 22*h* extends in the −Y direction from the end portion 22*g* of the mounting section side, extends in the −Z direction at the curved portion, changes direction to the +Y direction and then the +Z direction, and continues to the intermediate portion 22*k*.

The intermediate portion 22*k*, which extends in the +X direction from the first deformation portion 22*h*, is fixed to the carriage support section 41 of the ejection section movement mechanism 40. The second deformation portion 22*m* is a region that can deform following the movement in the X axis direction of the liquid ejection section 10, which is attached to the carriage support section 41 via the carriage 15 and the transport belt 42. The second deformation portion 22*m* continues from the intermediate portion 22*k*, extends in the −Z direction at the curved portion, changes its direction in the +X direction, and then continues to the end portion 22*n* of the ejection section side. The end portion 22*n* of the ejection section side extends diagonally forward, which is the +Y direction, from the second deformation portion 22*m* toward the liquid ejection section 10, and is fixed to the liquid ejection section 10.

Figure 4:
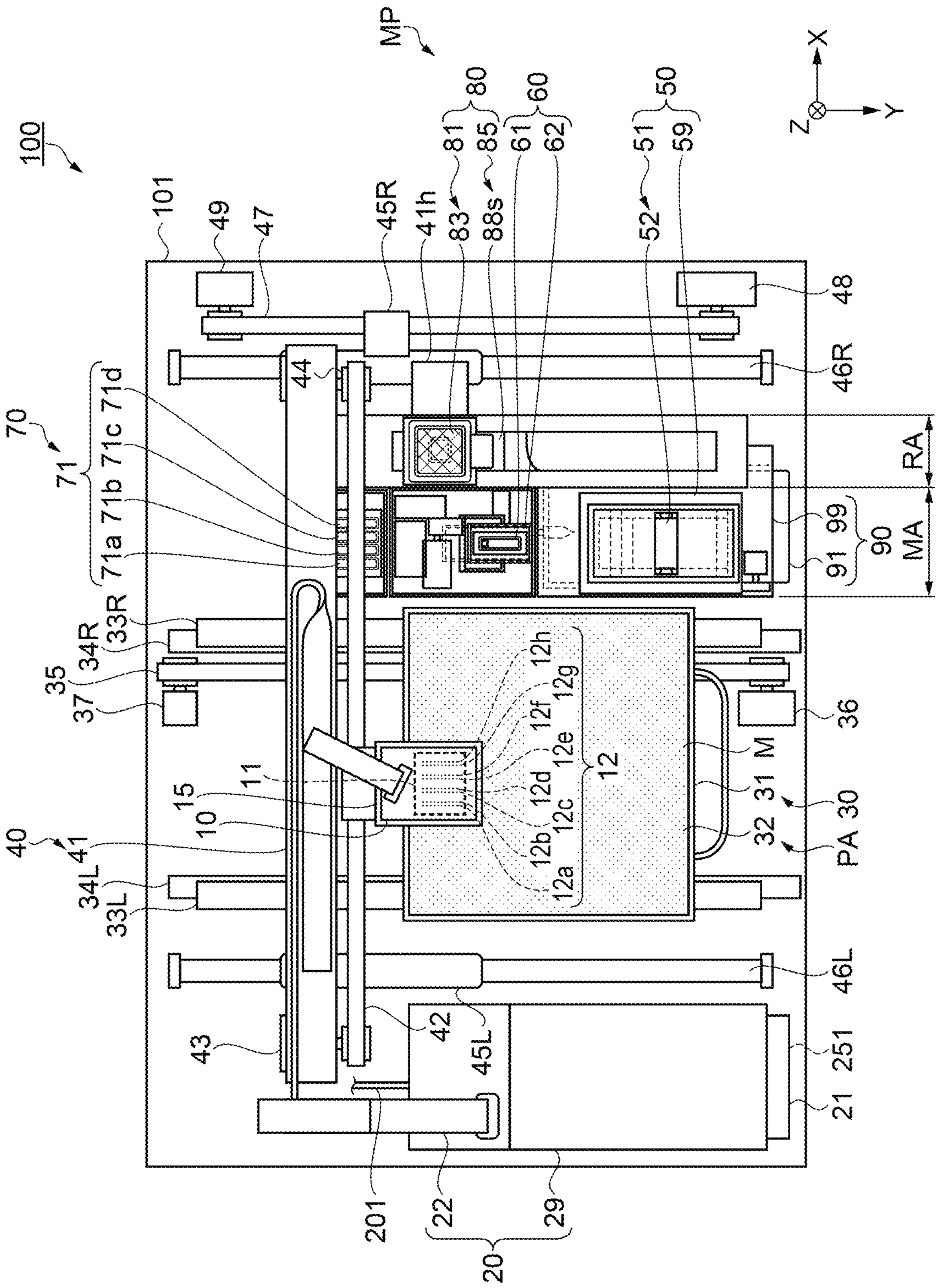
FIG. 4 is a schematic plan view illustrating the liquid ejection device in a state where the liquid ejection section is located in print area.

When the liquid ejection device 100 prints by ejecting ink from the nozzles N onto the medium M, the liquid ejection device 100 drives the ejection section movement mechanism 40 with the medium support section 31, which supports the medium M, is in the printing position. As illustrated in FIG. 4, the liquid ejection device 100 moves the liquid ejection section 10 to a position where one of the nozzles N comprising the nozzle array 12 is facing the medium M located in the print area PA. Then, the liquid ejection device 100 prints by having the liquid ejection section 10 eject ink from the nozzles N onto the medium M while repeatedly reciprocating the liquid ejection section 10 in the X axis direction and moving the liquid ejection section 10 in the +Y direction.

The maintenance section MP performs maintenance of the liquid ejection section 10. As illustrated in FIGS. 1 and 2, the maintenance section MP is provided in the base section 101 in an area that is to the +X direction side of the print area PA in the X axis direction. The maintenance section MP has a wiping section 50, a cleaning section 60, a standby section 70, a liquid reception section 80, and a waste liquid accommodation section 90.

As illustrated in FIGS. 2 to 10, the wiping section 50, the cleaning section 60, and the standby section 70 are located side by side in the Y axis direction. In this embodiment, the wiping section 50, the cleaning section 60, and the standby section 70 are located in the order of the standby section 70, the cleaning section 60, and the wiping section 50 from the −Y direction to the +Y direction in the Y axis direction.

Figure 8:
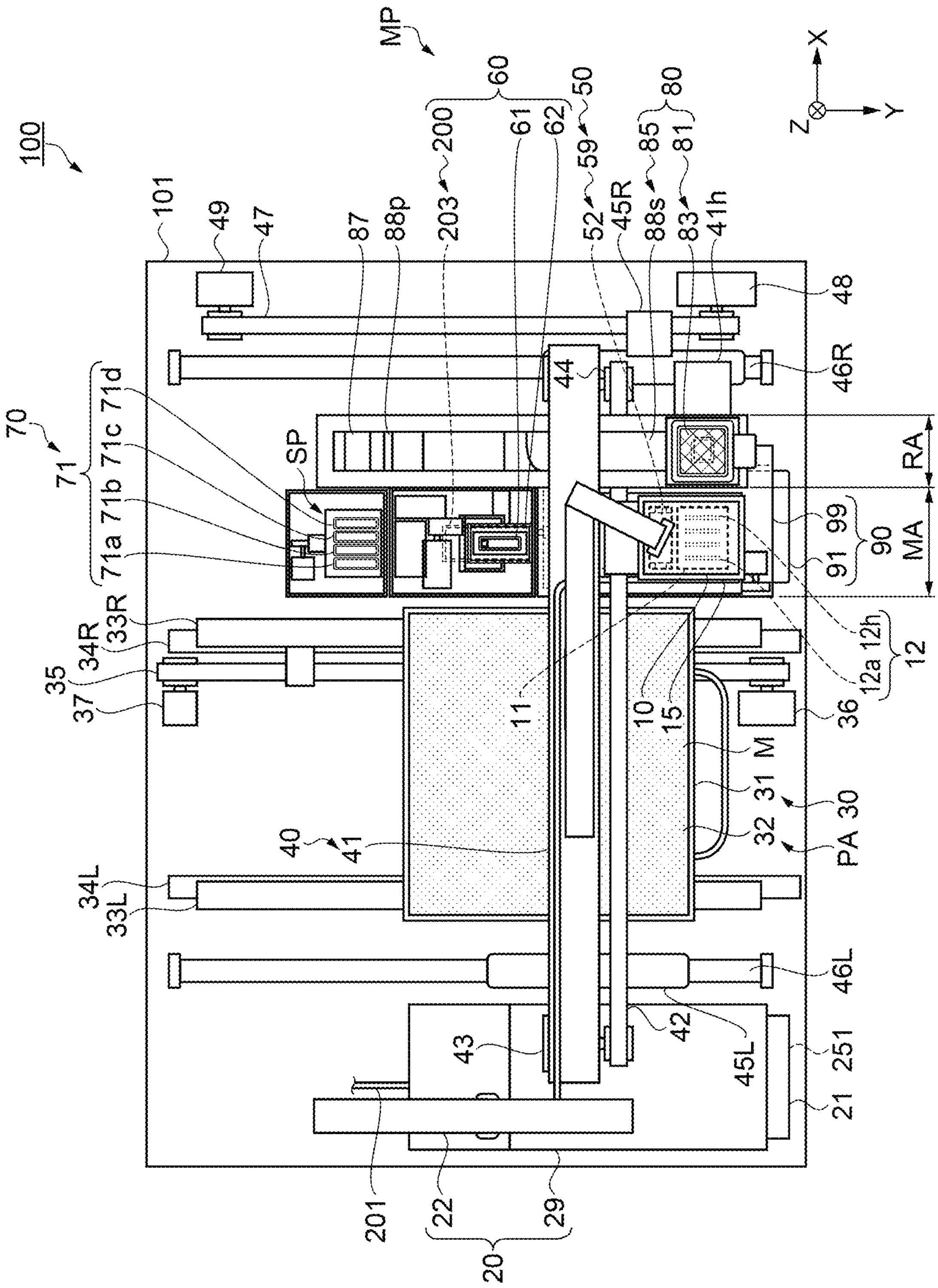
FIG. 8 is a schematic plan view illustrating the liquid ejection device at a position after the liquid ejection section is wiped.
Figure 9:
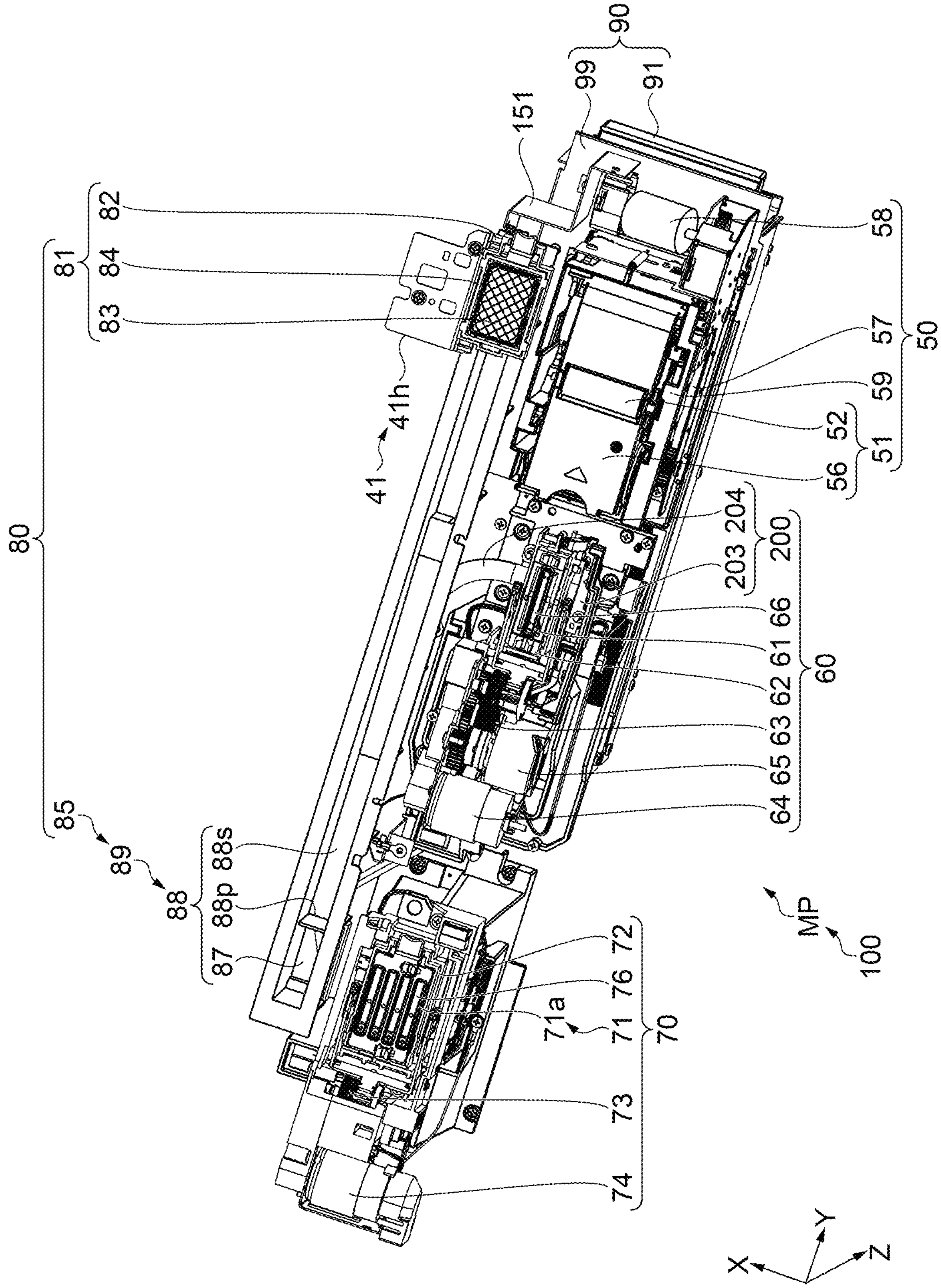
FIG. 9 is a perspective view illustrating a schematic configuration of a maintenance section according to an embodiment of the present disclosure.
Figure 10:
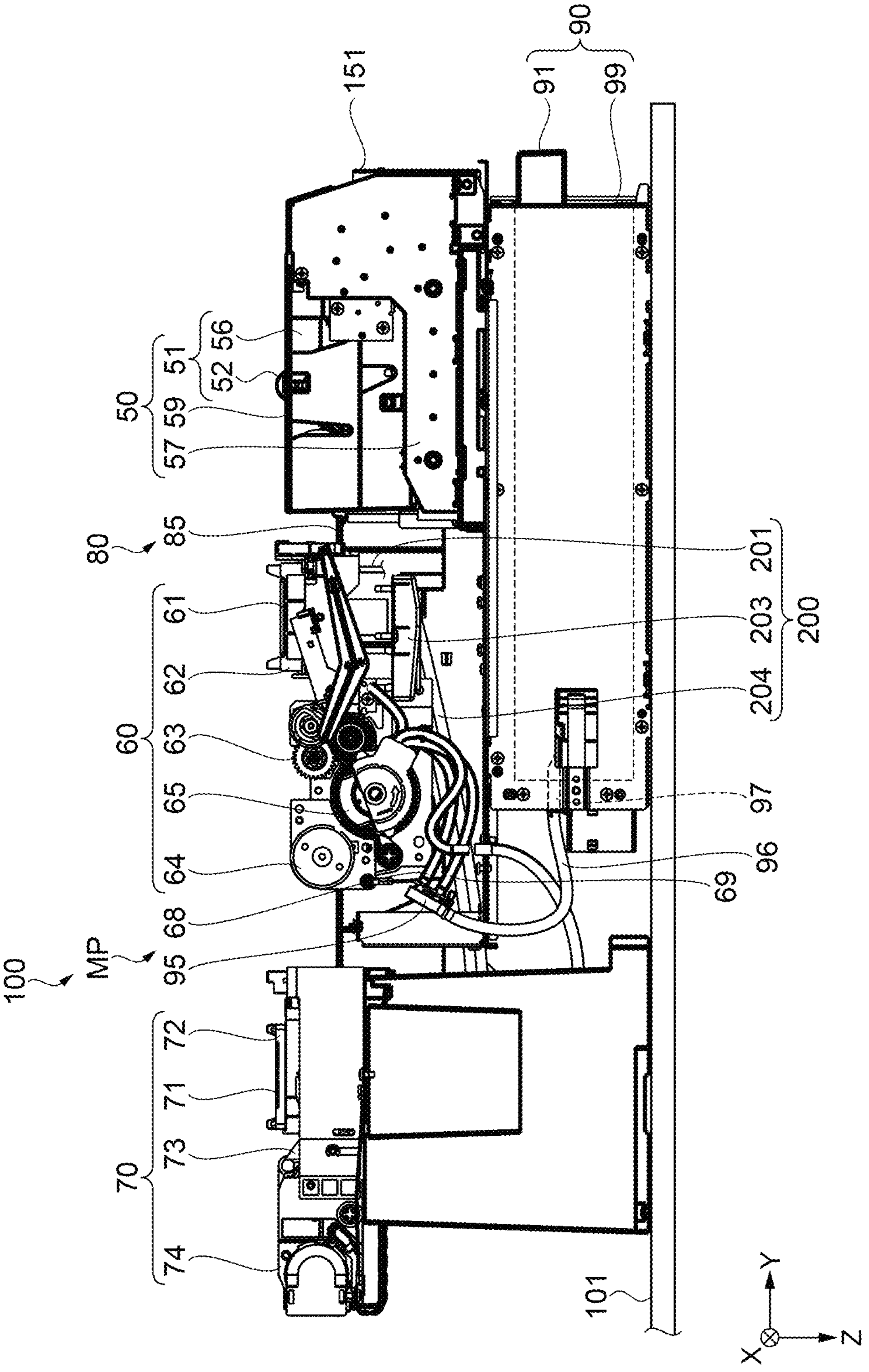
FIG. 10 is a side view illustrating a schematic configuration of the maintenance section.

As illustrated in FIGS. 1 to 11, the waste liquid accommodation section 90 is equipped with a waste liquid container 91 and a waste liquid container mounting section 99. The waste liquid container 91 can contain ink discharged from the liquid ejection section 10 as waste liquid. As illustrated in FIG. 10, the waste liquid container mounting section 99 is attached to the base section 101. As illustrated in FIGS. 1 and 2, the waste liquid container mounting section 99 is provided at a position on the +X direction side of the print area PA in the X axis direction and on the +Y direction side of the center of the base section 101 in the Y axis direction.

The waste liquid container mounting section 99 is provided so that the waste liquid container 91 can be attached to and detached from the front surface 103 of the outer member 102, which is the +Y direction side in the Y axis direction. The waste liquid container mounting section 99 is provided at a position where at least a portion of the waste liquid container mounting section 99 overlaps a wiping body 51 of the wiping section 50 (to be described later) as viewed from the direction along the Z axis direction. The waste liquid container mounting section 99 is equipped with a discharge tube 97 that is connected to the mounted waste liquid container 91 and discharges ink as waste liquid into the waste liquid container 91.

Figure 11:
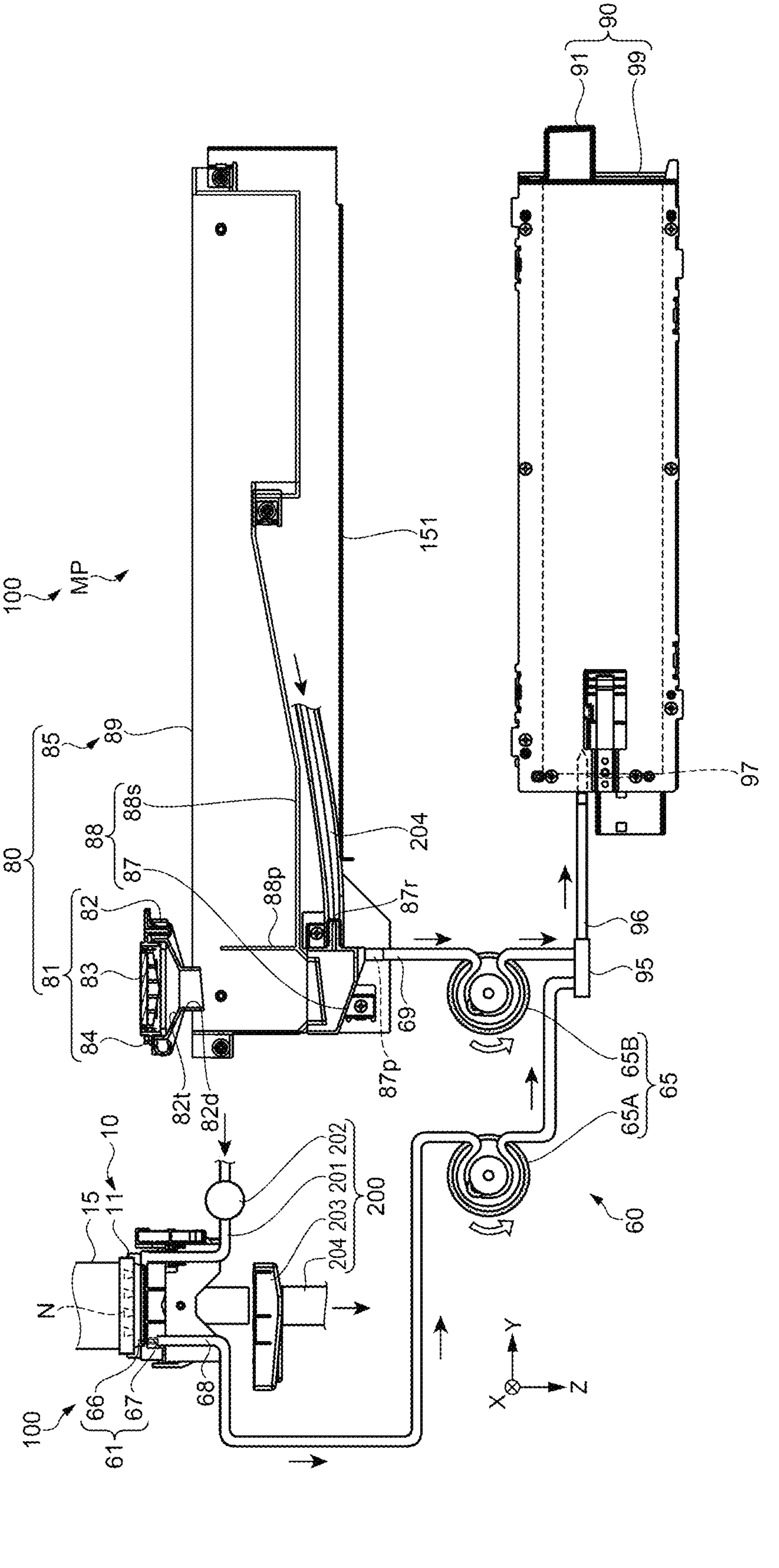
FIG. 11 is a schematic view illustrating a flow of liquid in the cleaning section and the liquid reception section.
Figure 12:
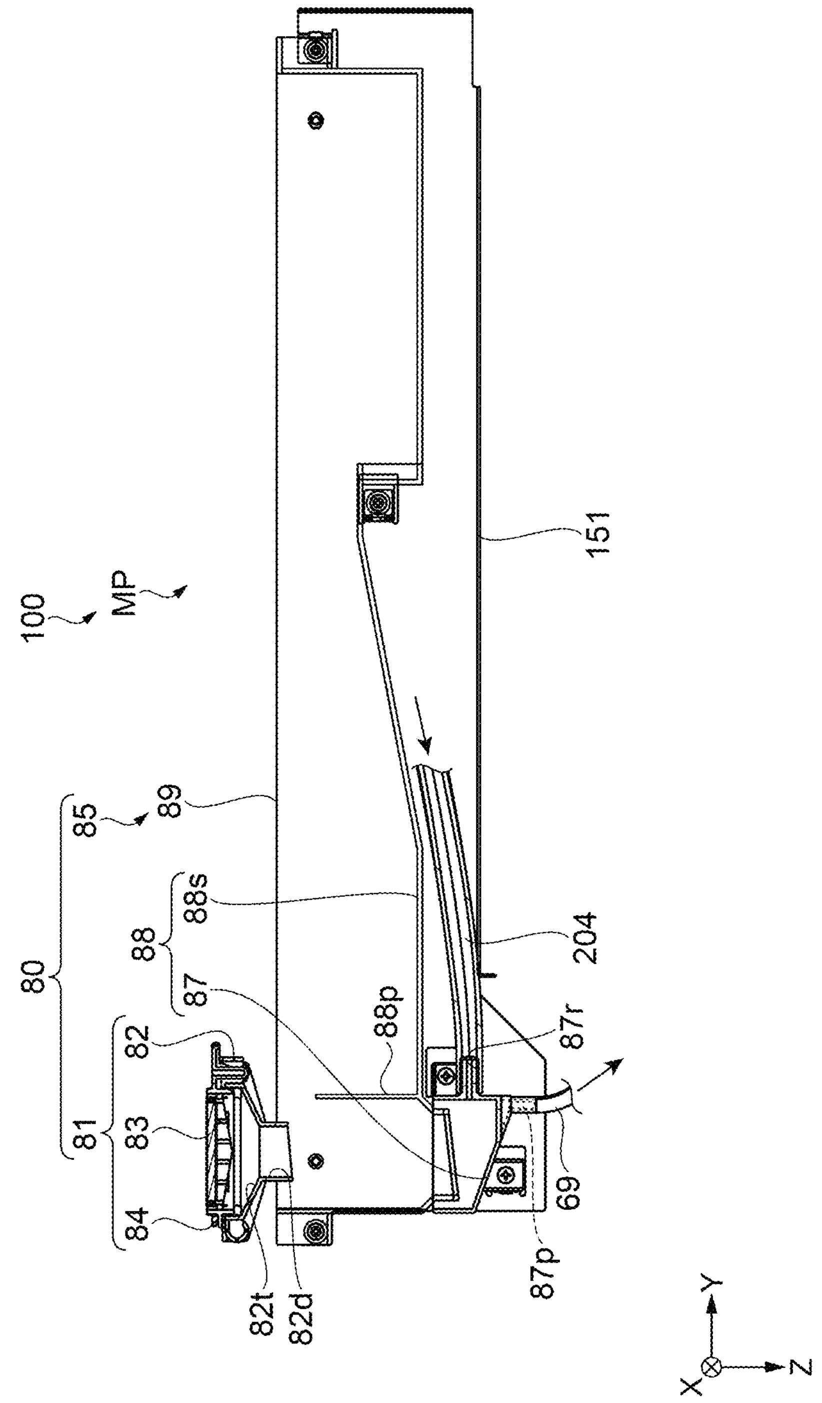
FIG. 12 is a cross-sectional view illustrating a schematic configuration of the liquid reception section as an embodiment of the present disclosure.

The liquid reception section 80 receives ink ejected as waste liquid from the liquid ejection section 10. As illustrated in FIGS. 2 to 9, 11, and 12, the liquid reception section 80 has the liquid receiving section 81 and a liquid tray 85. The liquid receiving section 81 is attached to the receiving section mounting section 41*h*, which is equipped with the carriage support section 41 of the ejection section movement mechanism 40. Note that FIG. 9 illustrates the liquid receiving section 81 at the position shown in FIG. 8. FIGS. 11 and 12 illustrate the liquid receiving section 81 at the position shown in FIG. 5.

The liquid receiving section 81 attached to the receiving section mounting section 41*h* is located on the +X direction side of the print area PA in the X axis direction. The liquid receiving section 81 attached to the receiving section mounting section 41*h* is located directly below the liquid ejection section 10 in the +Z direction as viewed from the direction along the X axis direction. The liquid receiving section 81 attached to the receiving section mounting section 41*h* can move across the depth direction, which is the Y axis direction, of the print area PA.

An area where the liquid receiving section 81 moves in the Y axis direction as shown in FIGS. 2 to 8 due to the movement of the carriage support section 41 in the Y axis direction is hereinafter referred to as a movement area RA. An area between the movement area RA and the print area PA in the X axis direction is referred to as a maintenance area MA. The wiping section 50, the cleaning section 60, the standby section 70, and the waste liquid accommodation section 90 are located in the maintenance area MA.

The liquid receiving section 81 is equipped with an attachment section 82, an absorbing member 83, and an absorbing member holding section 84. The +Z direction side of the attachment section 82 has a tapered flow path 82*t* and a discharge port 82*d* that passes through in the Z axis direction. The tapered flow path 82*t* connects the sidewall of the attachment section 82 and the discharge port 82*d*. The tapered flow path 82*t* has a tapered shape with a smaller cross-sectional area as it moves toward the discharge port 82*d*, that is, in the +Z direction.

The absorbing member 83 is formed of an absorbing member that can hold ink and through which ink can pass in the +Z direction. The absorbing member 83 is formed, for example, of a non-woven fabric capable of absorbing ink. The absorbing member holding section 84 holds the absorbing member 83. The absorbing member holding section 84 is attached to the attachment section 82 such that the absorbing member 83 can cover the tapered flow path 82*t* and the −Z direction side of the discharge port 82*d*. The absorbing member holding section 84 is provided with a plurality of through holes at a position at the −Z direction side of the absorbing member 83 to enable the absorbing member 83 to receive ink ejected from the liquid ejection section 10.

The liquid receiving section 81 receives ink ejected as waste liquid from the liquid ejection section 10. The liquid receiving section 81 temporarily holds the received ink in the absorbing member 83. Then, when the amount of ink received by the liquid receiving section 81 becomes more than the amount of ink that the absorbing member 83 can hold, the ink is discharged in the +Z direction from the discharge port 82*d* through the tapered flow path 82*t*.

Figure 5:
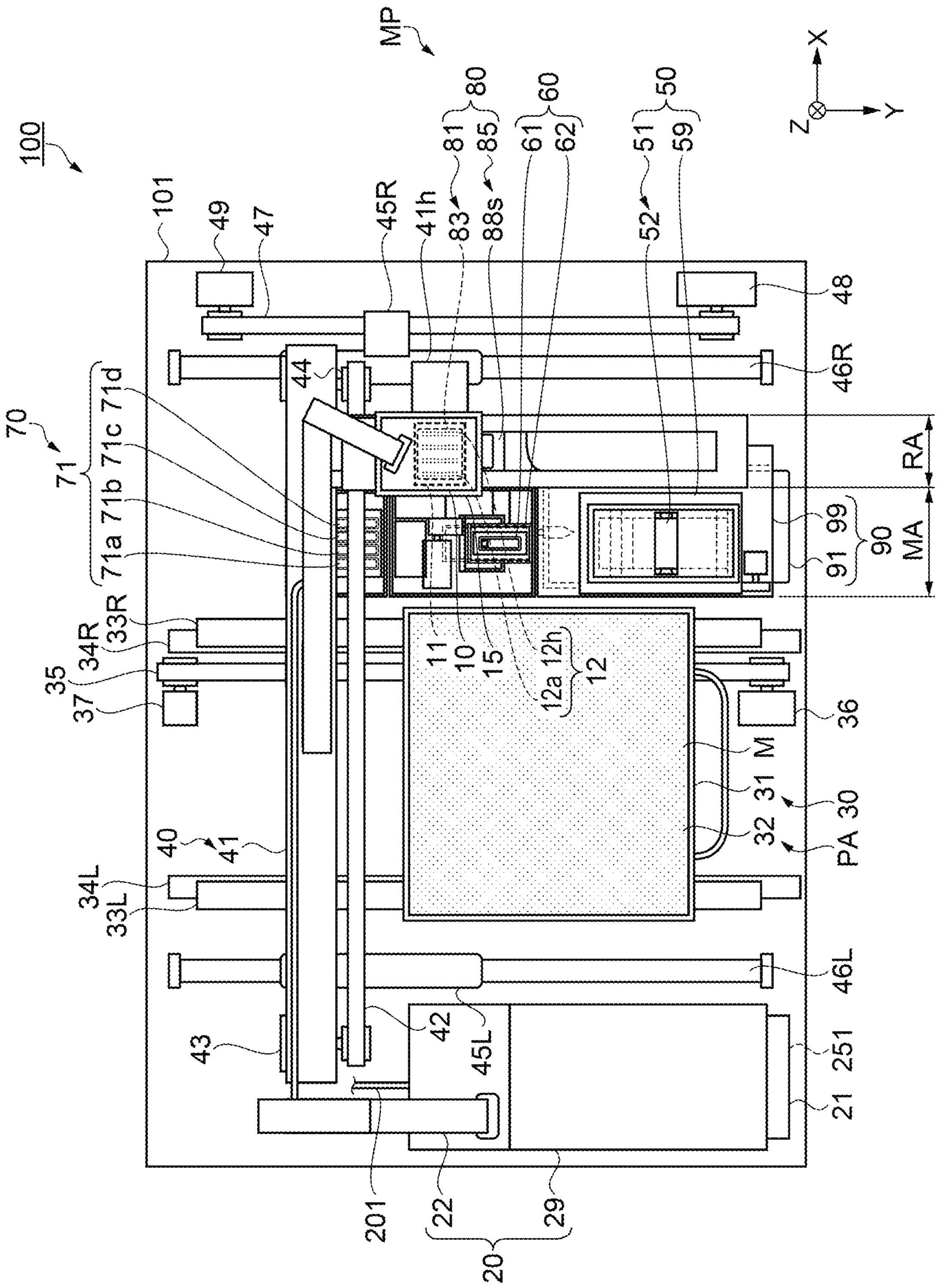
FIG. 5 is a schematic plan view illustrating the liquid ejection device in a state where the liquid ejection section is facing a liquid receiving section.

In this embodiment, as illustrated in FIG. 5, a dimension of an area where the liquid receiving section 81 can receive ink ejected from the liquid ejection section 10 is set larger than the dimension between the nozzle array 12*a* and the nozzle array 12*h* in the X axis direction. Note that the dimension of the area where the liquid receiving section 81 can receive the ink ejected from the liquid ejection section 10 may be smaller than the dimension between the nozzle array 12*a* and the nozzle array 12*h* in the X axis direction. The dimension of the area where the liquid receiving section 81 can receive the ink ejected from the liquid ejection section 10 is set larger in the Y axis direction than the width of the nozzle array 12 in the Y axis direction.

As illustrated in FIGS. 9 to 12, the liquid tray 85 is provided on the +Z direction side of the liquid receiving section 81 and receives ink discharged from the liquid receiving section 81. The liquid tray 85 is fixed to a fixing member 151, which is attached to the waste liquid container mounting section 99. The liquid tray 85 is fixed to the base section 101 via the fixing member 151 and the waste liquid container mounting section 99. The liquid tray 85 has a liquid receiving chamber 89 that can receive ink discharged from the liquid receiving section 81 in the +Z direction, which is vertically below the movement area RA. The liquid receiving chamber 89 opens toward the −Z direction so as to be able to receive ink discharged from the liquid receiving section 81.

Figure 7:
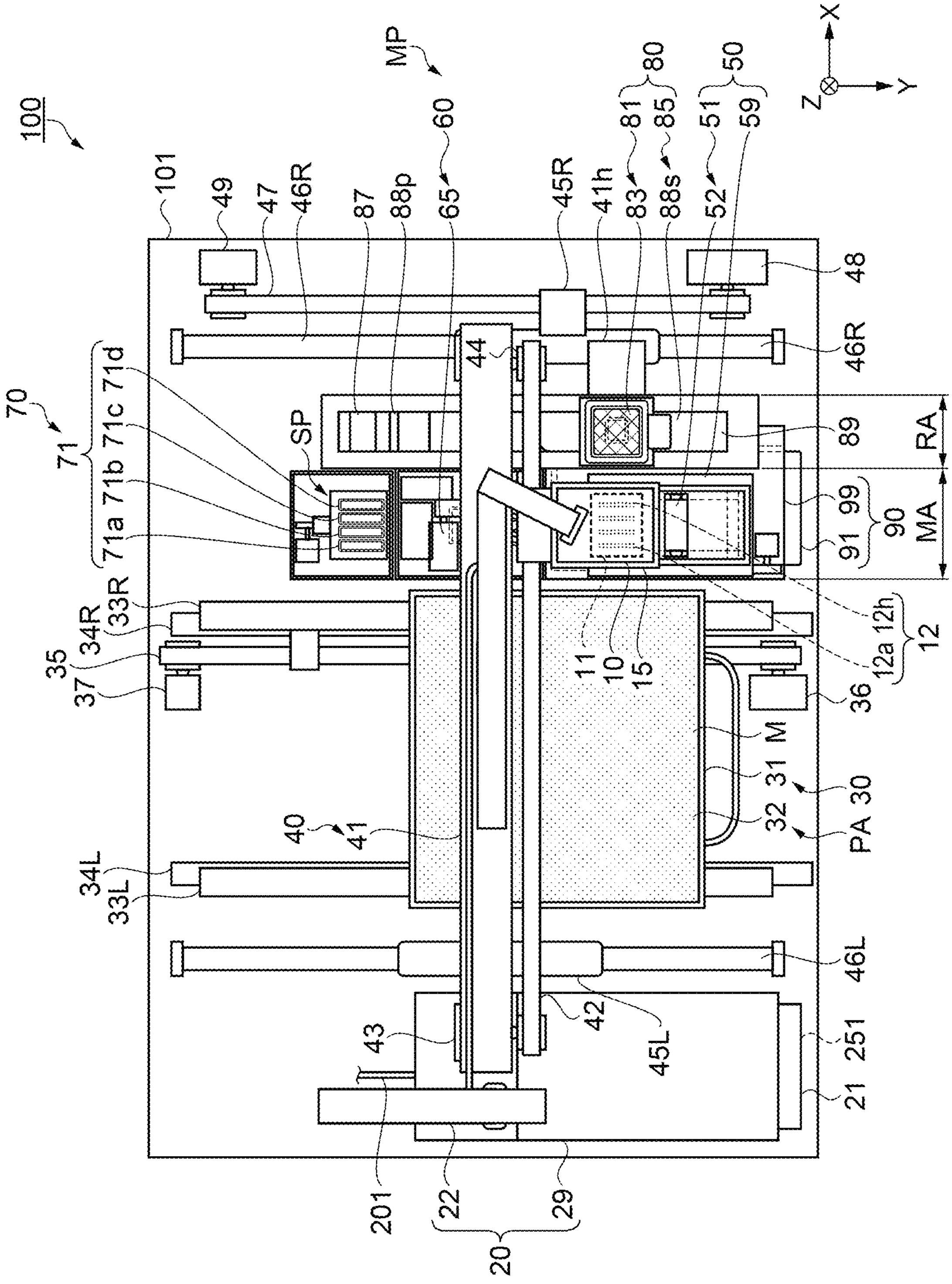
FIG. 7 is a schematic plan view illustrating the liquid ejection device at a position before the liquid ejection section is wiped.

As illustrated in FIGS. 7, 11, and 12, an end portion on the −Y direction side of the opening of the liquid receiving chamber 89 is located further on the −Y direction than the print area PA. The +Y direction side end portion of the opening of the liquid receiving chamber 89 is located further on the +Y direction than the print area PA. In other words, the opening of the liquid receiving chamber 89 of the liquid tray 85 is provided in the Y axis direction spanning the Y axis direction of the movement area RA. Further, the liquid receiving chamber 89 is provided with a partition wall 88*p*. The partition wall 88*p* is located further in the −Y direction than is the print area PA.

The discharge port 82*d* of the liquid receiving section 81 is inserted into the liquid receiving chamber 89 through the opening of the liquid receiving chamber 89. In other words, the +Z direction side end portion of the discharge port 82*d* of the liquid receiving section 81 is located inside the liquid receiving chamber 89 of the liquid tray 85. The X axis dimension of the opening of the liquid receiving chamber 89 is set larger than the X axis external dimension of the discharge port 82*d*. Note that in this embodiment, the X axis dimension of the opening of the liquid receiving chamber 89 is set smaller than the X axis dimension of the liquid receiving section 81.

As illustrated in FIGS. 9, 11, and 12, the liquid receiving chamber 89 is provided with an outflow section 87 where ink flows out from the liquid receiving chamber 89 through a second waste liquid tube 69 (to be described later). As illustrated in FIG. 7, the outflow section 87 is provided at the −Y direction side of the partition wall 88*p*. That is, the outflow section 87 is provided on the −Y direction side of the print area PA. As illustrated in FIGS. 9, 11, and 12, the bottom surface 88, which extends in the Y axis direction of the liquid receiving chamber 89, is composed of a tray bottom surface 88*s* and the outflow section 87. The bottom wall of the outflow section 87 is provided with an outflow port 87*p* to which the second waste liquid tube 69 is connected. In addition, an introduction port 87*r* to which a washing liquid discharge flow path 204 (to be described later) is connected is provided on a sidewall on the +Y direction side of the outflow section 87. By this, the washing liquid flows from the cap washing section 200 to the outflow section 87 through the washing liquid discharge flow path 204 and the introduction port 87*r*.

When the liquid ejection device 100 performs flushing to eject ink as waste liquid from the nozzles N of the liquid ejection section 10 toward the liquid receiving section 81 of the liquid reception section 80, the liquid ejection device 100 drives and controls the movement motor 43 of the ejection section movement mechanism 40. By controlling the drive of the movement motor 43, the liquid ejection section 10 is moved to a position where any one of the nozzle arrays 12*a* to 12*h* to be flushed is facing the liquid receiving section 81. In FIG. 5, the nozzle arrays 12*a* to 12*h* face the liquid receiving section 81.

The liquid ejection device 100 then performs flushing by ejecting ink from the nozzles N of the liquid ejection section 10. During flushing, the liquid receiving section 81 receives the ink ejected from the nozzles N of the liquid ejection section 10 to the absorbing member 83. The ink received by the absorbing member 83 of the liquid receiving section 81 is discharged from the discharge port 82*d* into the liquid receiving chamber 89 of the liquid tray 85.

The wiping section 50 is provided in the maintenance area MA of the base section 101 so as to be able to wipe the nozzle surface 11 where the nozzles N of the liquid ejection section 10 are provided. As illustrated in FIGS. 2, 9, and 10, the wiping section 50 is equipped with a wiping body 51, a wiping body mounting section 59, a wiping section drive mechanism 57, and a wiping section motor 58. The wiping section 50 is provided on the −Z direction side of the waste liquid accommodation section 90. The wiping section 50 is fixed to the base section 101 via the waste liquid container mounting section 99.

The wiping body mounting section 59 is provided in the Y axis direction at a position that is on the +Y direction side from the center of the base section 101. The wiping body mounting section 59 is located vertically below the upper cover 104, which is in the +Z direction. The wiping body mounting section 59 is provided so that the wiping body 51 can be attached to and detached from above, which is the −Z direction side, by opening the upper cover 104.

Figure 13:
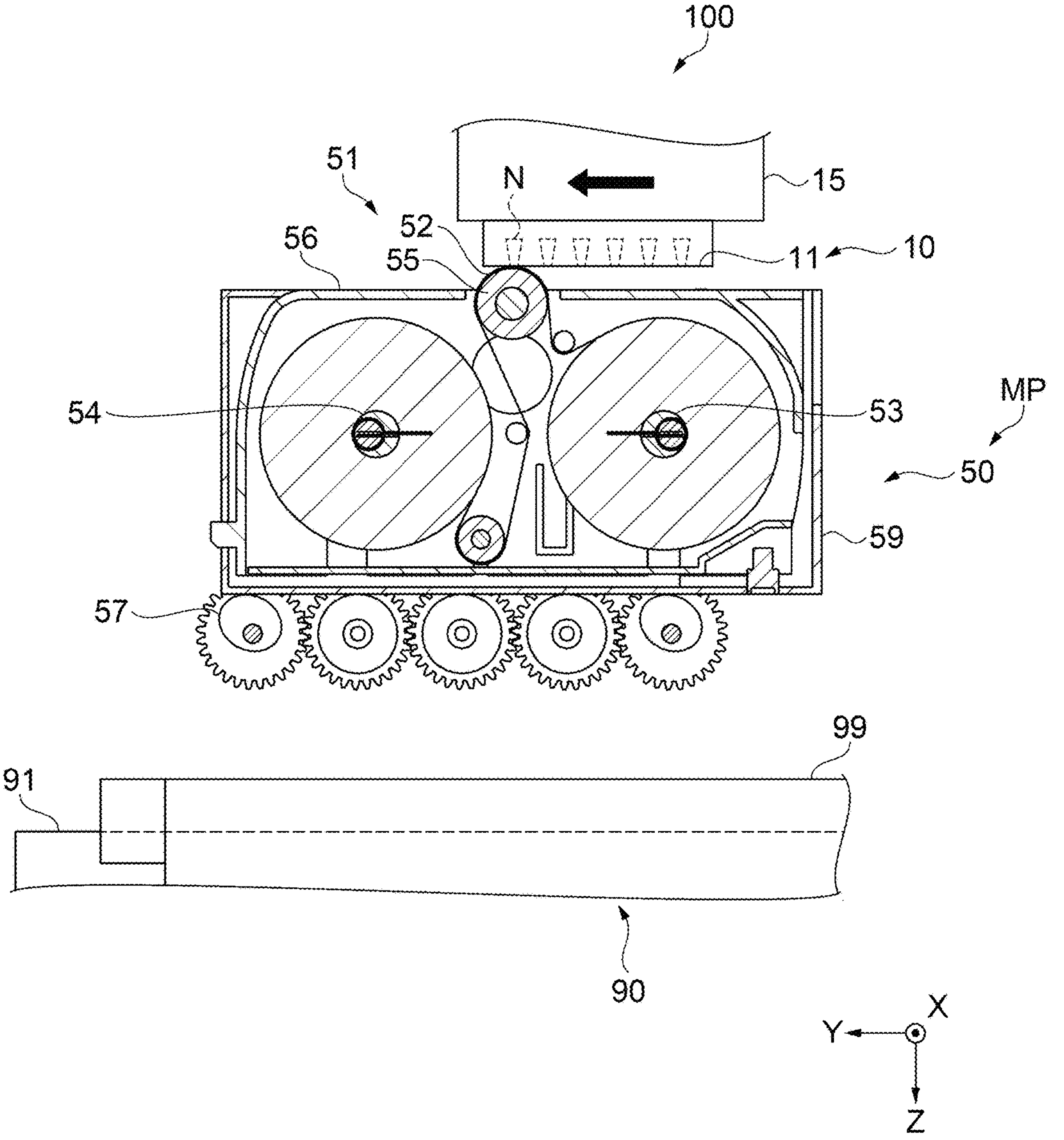
FIG. 13 is a cross-sectional view illustrating a state in which a wiping body according to an embodiment of the present disclosure is at a wipeable position.
Figure 14:
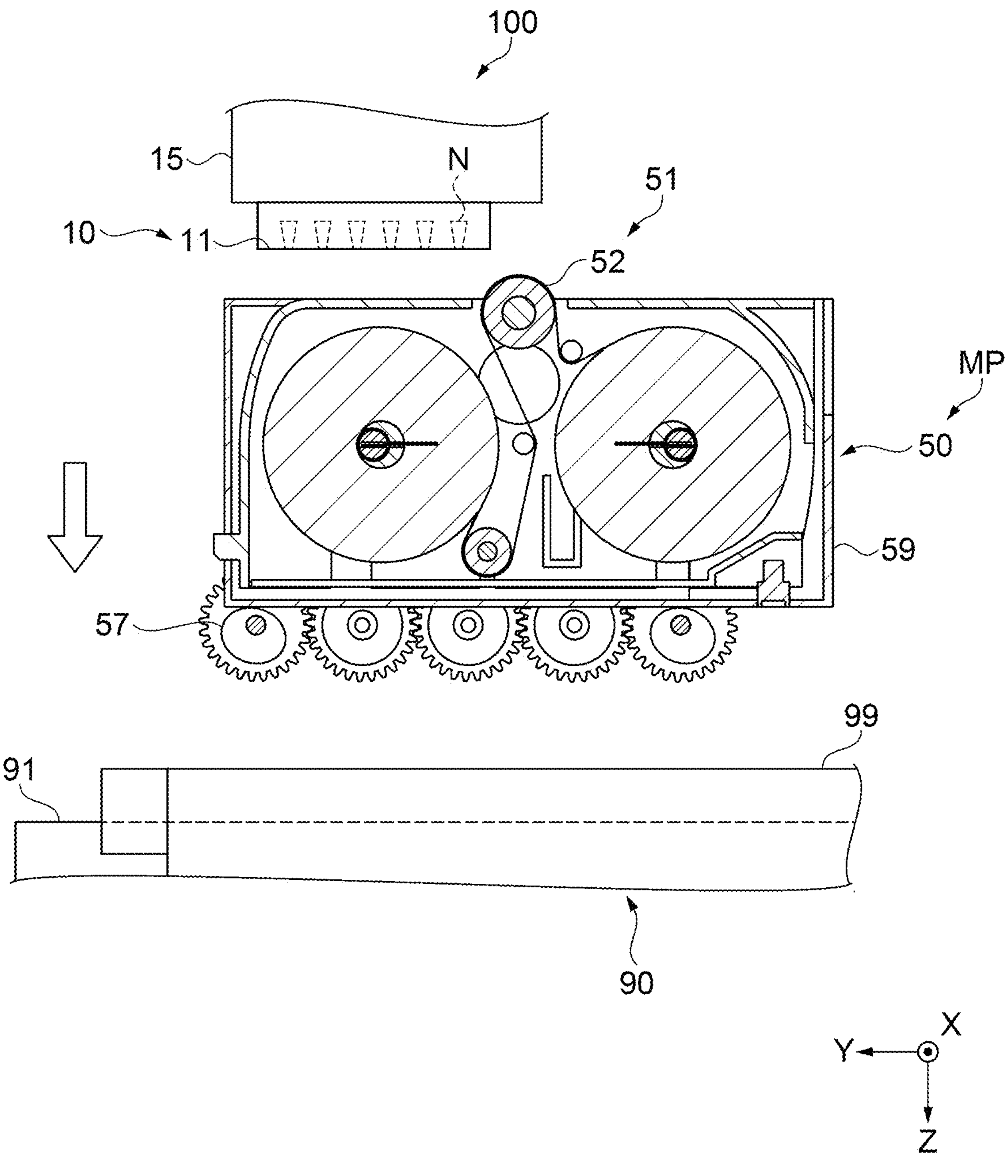
FIG. 14 is a cross-sectional view illustrating a state in which the wiping body is in a separated position.

As illustrated in FIGS. 13 and 14, the wiping body 51 is composed of a strip-shaped member 52, an unwind shaft 53, a wind-up shaft 54, a pressing member 55, and a case 56. The unwind shaft 53, the wind-up shaft 54, and the pressing member 55 are rotatably provided in the case 56. The wind-up shaft 54 is provided further on the +Y direction than the unwind shaft 53. The pressing member 55 is located between the unwind shaft 53 and the wind-up shaft 54 in the Y axis direction, and is located further on the −Z direction than the unwind shaft 53 and the wind-up shaft 54 in the Z axis direction.

The strip-shaped member 52 is formed of a sheet-like absorbent body that can absorb liquid. The X axis dimension of the strip-shaped member 52 should be larger than the X axis dimension of the nozzle surface 11, as illustrated in FIGS. 7 and 8. However, the X axis dimension of the strip-shaped member 52 may be smaller than the X axis dimension of the nozzle surface 11. As illustrated in FIGS. 13 and 14, the strip-shaped member 52 is held in the case 56 so that it is pushed in the −Z direction by the pressing member 55 while the strip-shaped member 52 is being unwound from the unwind shaft 53 and then being wound onto the wind-up shaft 54. In this embodiment, the nozzle surface 11 of the liquid ejection section 10 is wiped by moving the liquid ejection section 10 in the Y axis direction with respect to the wiping section 50, while the strip-shaped member 52 is in contact with the nozzle surface 11 of the liquid ejection section 10.

By driving and controlling the wiping section motor 58, the wiping section drive mechanism 57 moves the wiping body mounting section 59 and the wiping body 51 mounted on the wiping body mounting section 59 to the wipeable position and to the separated position. The wipeable position is a position where the strip-shaped member 52 exposed in the −Z direction from the case 56 can contact the nozzle surface 11, as illustrated in FIG. 13. The separated position is a position where the strip-shaped member 52 does not contact the nozzle surface 11, as illustrated in FIG. 14. By driving and controlling the wiping section motor 58, the wiping section drive mechanism 57 winds up the strip-shaped member 52, which was unwound from the unwinding shaft 53 and then used to wipe the nozzle surface 11, onto the wind-up shaft 54.

When wiping the nozzle surface 11 by the wiping section 50, the liquid ejection device 100 drives the wiping section drive mechanism 57 to move the wiping body 51 to the wipeable position in which the wiping section 50 can wipe. Then, the liquid ejection device 100 drives the ejection section movement mechanism 40 to move the liquid ejection section 10 to a position that the −Y direction side of the strip-shaped member 52, as illustrated in FIG. 7. Then, the liquid ejection device 100 moves the liquid ejection section 10 in the +Y direction to bring the nozzle surface 11 into contact with the strip-shaped member 52 in the wipeable position, as illustrated in FIG. 13. Then, the liquid ejection device 100 wipes the nozzle surface 11 by the wiping section 50 by moving the liquid ejection section 10 in the +Y direction as indicated by the arrow in FIG. 13.

Then, as illustrated in FIG. 8, the liquid ejection device 100 moves the nozzle surface 11 of the liquid ejection section 10 to a wiping end position, which is the +Y direction side of the strip-shaped member 52, to finish the wiping the nozzle surface 11. After wiping the nozzle surface 11, then, for example, the liquid ejection device 100 drives the wiping section drive mechanism 57 to move the liquid ejection section 10 in the −Y direction from the wiping end position illustrated in FIG. 8 to the standby position SP illustrated in FIG. 3. By this, the liquid ejection device 100 moves the wiping body mounting section 59 and the wiping body 51 mounted on the wiping body mounting section 59 from the wipeable position to the separated position, as illustrated by the white arrow in FIG. 14. Then, the liquid ejection device 100 drives the ejection section movement mechanism 40 to move the liquid ejection section 10 in the −Y direction through the −Z direction side, which is vertically above the wiping section 50.

The cleaning section 60 is provided in the maintenance area MA. The cleaning section 60 is provided in the base section 101 so as to be able to perform cleaning that forces ink to be discharged from the nozzles N of the liquid ejection section 10. As illustrated in FIGS. 2, 9, and 10, the cleaning section 60 is equipped with a suction cap 61, a suction cap holding section 62, a cleaning section drive mechanism 63, a cleaning section motor 64, a suction pump 65, and a cap washing section 200. The suction pump 65 is an example of a suction section. The cleaning section 60 is provided on the −Z direction side of the waste liquid accommodation section 90. The cleaning section 60 is fixed to the base section 101 via the waste liquid container mounting section 99.

Figure 6:
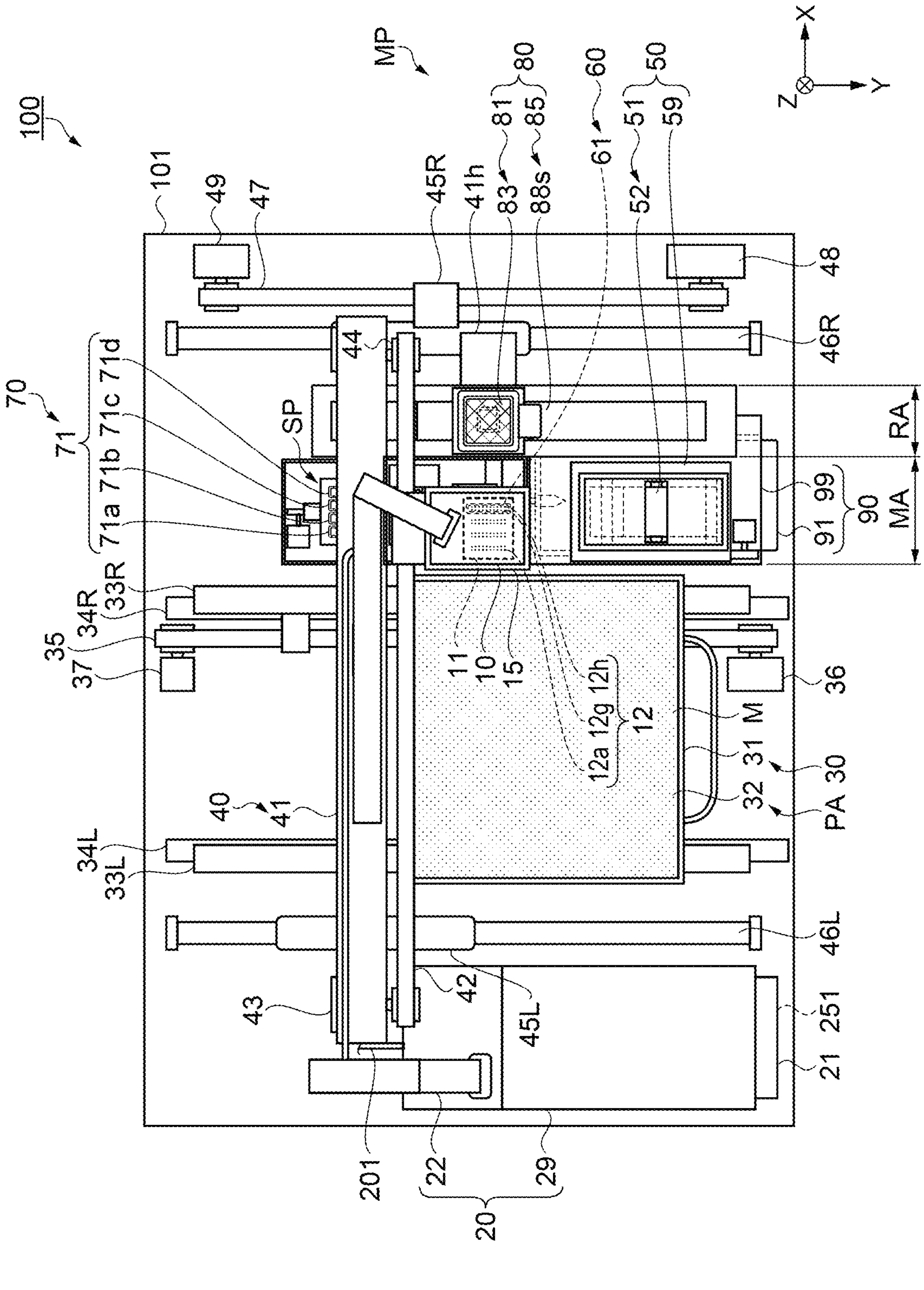
FIG. 6 is a schematic plan view illustrating the liquid ejection device in a state where the liquid ejection section is facing a cleaning section.

The suction cap 61 is provided at a position that overlaps the wiping body 51 of the wiping section 50 as viewed from the direction along the Y axis direction. In FIG. 6, the suction cap 61 is positioned facing the nozzle arrays 12*g* and 12*h*, which are located further on the +X direction than the center of the nozzle array 12 of the liquid ejection section 10. At this time, the suction cap 61 is provided in an area on the +X direction side with respect to the print area PA so that the nozzle surface 11 does not face the print area PA. As a result, the dimension between the suction cap 61 and the print area PA in the X axis direction is larger than the dimension of the nozzle surface 11 in the X axis direction.

As illustrated in FIGS. 9 and 11, the suction cap 61 has a recess section 66 that can form a space in which a plurality of nozzles N open when the suction cap 61 contacts the nozzle surface 11 of the liquid ejection section 10. The suction cap 61 is an example of a cap CP that can form a space in which the nozzles N open. The portion of the suction cap 61 that is located at the end portion of the −Z direction side and that contacts the nozzle surface 11 of the liquid ejection section 10 is also called the lip section. As illustrated in FIGS. 2, 9, and 10, the suction cap 61 is held by the suction cap holding section 62.

As illustrated in FIGS. 2 and 10 to 12, the suction cap 61 connects to the waste liquid container 91, which contains ink as waste liquid, through a first waste liquid tube 68, a joint 95, and a third waste liquid tube 96. The first waste liquid tube 68 connects the discharge section 67 (see FIG. 11) of the suction cap 61 to the joint 95. The second waste liquid tube 69 connects the outflow port 87*p* of the outflow section 87 in the liquid tray 85 to the joint 95. The joint 95 connects the first waste liquid tube 68 and the second waste liquid tube 69 to the third waste liquid tube 96, which is connected to a discharge tube 97 of the waste liquid container mounting section 99.

The cleaning section drive mechanism 63 moves the suction cap holding section 62 in the Z axis direction by driving and controlling the cleaning section motor 64. The suction cap 61 moves in the Z axis direction between a non-capping position that does not contact the nozzle surface 11 and a suction-capable position that contacts the nozzle surface 11, as the suction cap holding section 62 moves in the Z axis direction. The cleaning section drive mechanism 63 drives and controls the cleaning section motor 64 to cause the suction pump 65 to perform a suction operation.

The suction pump 65 in this embodiment is a tube pump whose roller rotates around a rotation shaft while pressing and crushing the first waste liquid tube 68 and the second waste liquid tube 69, and has a first suction section 65A and a second suction section 65B. The first suction section 65A is provided on the first waste liquid tube 68 to be able to suck the space formed by the suction cap 61. The second suction section 65B is provided on the second waste liquid tube 69 to be able to suck the inside of the liquid receiving chamber 89 of the liquid reception section 80. Note that the first suction section 65A and the second suction section 65B are provided side by side in the X axis direction, but FIG. 11 shows the configuration of the cleaning section 60 conceptually to show the flow of ink from the suction cap 61 to the waste liquid container 91.

When the liquid ejection device 100 performs cleaning using the cleaning section 60, the liquid ejection device 100 drives the ejection section movement mechanism 40 while the suction cap 61 is in the non-capping position. Then, the liquid ejection device 100 moves the liquid ejection section 10 to a position where one of the nozzle arrays 12*a* to 12*h* is facing the suction cap 61. In FIG. 6, the liquid ejection section 10 is at a position where the nozzle arrays 12*g* and 12*h* face the suction cap 61.

By driving the cleaning section drive mechanism 63, the suction cap 61 moves from the non-capping position to the suction-capable position. As a result, as illustrated in FIG. 11, a space in which the plurality of nozzles N comprising the nozzle arrays 12*g* and 12*h* open is formed. Furthermore, by driving the cleaning section drive mechanism 63, the first suction section 65A and the second suction section 65B of the suction pump 65 are rotated as indicated by the white arrows, and the suction pump 65 performs the suction operation.

When the suction pump 65 performs the suction operation, the first suction section 65A sucks the space in which the nozzles N open, and the ink is discharged from the plurality of nozzles N comprising the nozzle arrays 12*g* and 12*h* into the recess section 66 of the suction cap 61. The ink received by the recess section 66 of the suction cap 61 as the waste liquid flows into and is contained in the waste liquid container 91 through the first waste liquid tube 68, the joint 95, the third waste liquid tube 96, and the discharge tube 97 of the waste liquid container mounting section 99, as shown by the arrows in FIG. 11.

When the suction pump 65 performs the suction operation, the second suction section 65B sucks the inside of the liquid receiving chamber 89. The ink in the outflow section 87 in the liquid receiving chamber 89 flows into the waste liquid container 91 through the outflow port 87*p*, the second waste liquid tube 69, the joint 95, the third waste liquid tube 96, and the discharge tube 97 of the waste liquid container mounting section 99, and the ink is contained as waste liquid, as shown by the arrows in FIGS. 11 and 12. The second waste liquid tube 69 is an example of an outflow flow path, and the second suction section 65B is an example of an outflow pump.

The cap washing section 200 is provided in the cleaning section 60 so as to be able to wash the suction cap 61. As illustrated in FIGS. 2 and 9 to 11, the cap washing section 200 is equipped with a washing liquid supply flow path 201, a washing liquid supply section 202, a washing liquid tray 203, and a washing liquid discharge flow path 204.

The washing liquid supply flow path 201 connects the washing liquid container 251, which is mounted on the liquid container mounting section 29, to the suction cap 61. The washing liquid supply section 202 is provided in the intermediate portion of the washing liquid supply flow path 201 and supplies the washing liquid in the washing liquid container 251 to the suction cap 61. The washing liquid supply section 202 is, for example, a feed pump provided in the intermediate portion of the washing liquid supply flow path 201. Diaphragm pumps, which change the volume of a pump chamber provided intermediate to the washing liquid supply flow path 201 to suck in and to discharge the washing liquid, tube pumps, which are similar to the suction pump 65, and other pumps can be used as feed pumps.

The washing liquid tray 203 is located on the +Z direction side of the suction cap 61 and receives the washing liquid that is supplied to the suction cap 61 and then overflows from the suction cap 61. As illustrated in FIG. 11, the washing liquid discharge flow path 204 connects the washing liquid tray 203 to the liquid tray 85 so that the washing liquid that has overflowed from the suction cap 61 can be discharged from the washing liquid tray 203.

When washing the suction cap 61 using the cap washing section 200, the liquid ejection device 100 drives the washing liquid supply section 202 while the suction cap 61 is in the non-capping position. By this, the liquid ejection device 100 causes the washing liquid contained in the washing liquid container 251 to flow into the suction cap 61. The washing liquid flows into the suction cap 61 to wash the inside of the suction cap 61.

If the supply of washing liquid into the suction cap 61 is continued, the washing liquid will overflow from the suction cap 61 through the lip section of the suction cap 61. The washing liquid overflows from the suction cap 61 while washing the lip section, and it is received in the washing liquid tray 203. The washing liquid tray 203 is located further in the −Z direction than the outflow section 87 of the liquid receiving chamber 89 of the liquid tray 85. In other words, the washing liquid tray 203 and the outflow section 87 of the liquid receiving chamber 89 are located with a difference in water head. By this, the washing liquid received by the washing liquid tray 203 is then discharged through the washing liquid discharge flow path 204 to the outflow section 87 of the liquid receiving chamber 89 of the liquid tray 85.

The standby section 70 is provided in the maintenance area MA. The standby section 70 is provided on the base section 101 so as to be able to form a space in which the nozzles N of the liquid ejection section 10 open. As illustrated in FIGS. 2, 9, and 10, the standby section 70 is equipped with a standby cap 71, a standby cap holding section 72, a standby cap raising and lowering mechanism 73, and a standby section motor 74. The standby section 70 is provided on further the −Y direction than the print area PA in the Y axis direction.

The standby cap 71 in this embodiment includes a standby cap 71*a* corresponding to the nozzle arrays 12*a* and 12*b*. The standby cap 71 includes a standby cap 71*b* corresponding to the nozzle arrays 12*c* and 12*d*. The standby cap 71 includes a standby cap 71*c* corresponding to the nozzle arrays 12*e* and 12*f*. The standby cap 71 includes a standby cap 71*d* corresponding to the nozzle arrays 12*g* and 12*h*. As illustrated in FIG. 9, the standby cap 71 has a recess section 76 that can contact the nozzle surface 11 of the liquid ejection section 10 to form a space in which the plurality of nozzles N open. The standby caps 71*a*, 71*b*, 71*c*, 71*d* are examples of the cap CP that can form a space in which the nozzles N open. The portion of standby caps 71*a*, 71*b*, 71*c*, 71*d* that is located at an end portion of the −Z direction side and that contacts the nozzle surface 11 of the liquid ejection section 10 is also referred to as a lip section.

The standby cap holding section 72 holds the standby caps 71*a*, 71*b*, 71*c*, 71*d*. The standby cap raising and lowering mechanism 73 moves the standby cap holding section 72 in the Z axis direction by driving and controlling the standby section motor 74. As the standby cap holding section 72 is moved in the Z axis direction, the standby cap 71 is moved in the Z axis direction between a non-capping position that does not contact the nozzle surface 11 and a capping position that contacts the nozzle surface 11.

The standby caps 71*a*, 71*b*, 71*c*, 71*d* in the capping position contact the nozzle surface 11 of the liquid ejection section 10. By this, the standby caps 71*a*, 71*b*, 71*c*, 71*d* in the capping positions form spaces in which the nozzles N comprising the corresponding nozzle arrays 12*a*, 12*b*, 12*c*, 12*d*, 12*e*, 12*f*, 12*g*, 12*h* open. This capping in which the standby cap 71 forms a space in which the nozzles N open is referred to as standby capping. Standby capping can suppress the evaporation of moisture from the ink in the liquid ejection section 10 through the nozzles N.

The standby caps 71a, 71b, 71c, 71d are provided at positions between the print area PA and the movement area RA in the X axis direction. The standby caps 71a, 71b, 71c, 71d are provided at positions that overlap the wiping body 51 of the wiping section 50 as viewed from the direction along the Y axis direction. The standby caps 71a, 71b, 71c, 71d are provided further in the −Y direction than the print area PA in the Y axis direction. Note that the standby cap 71 may be configured to collectively surround and cap all the nozzles N comprising the nozzle arrays 12a to 12h.

Figure 3:
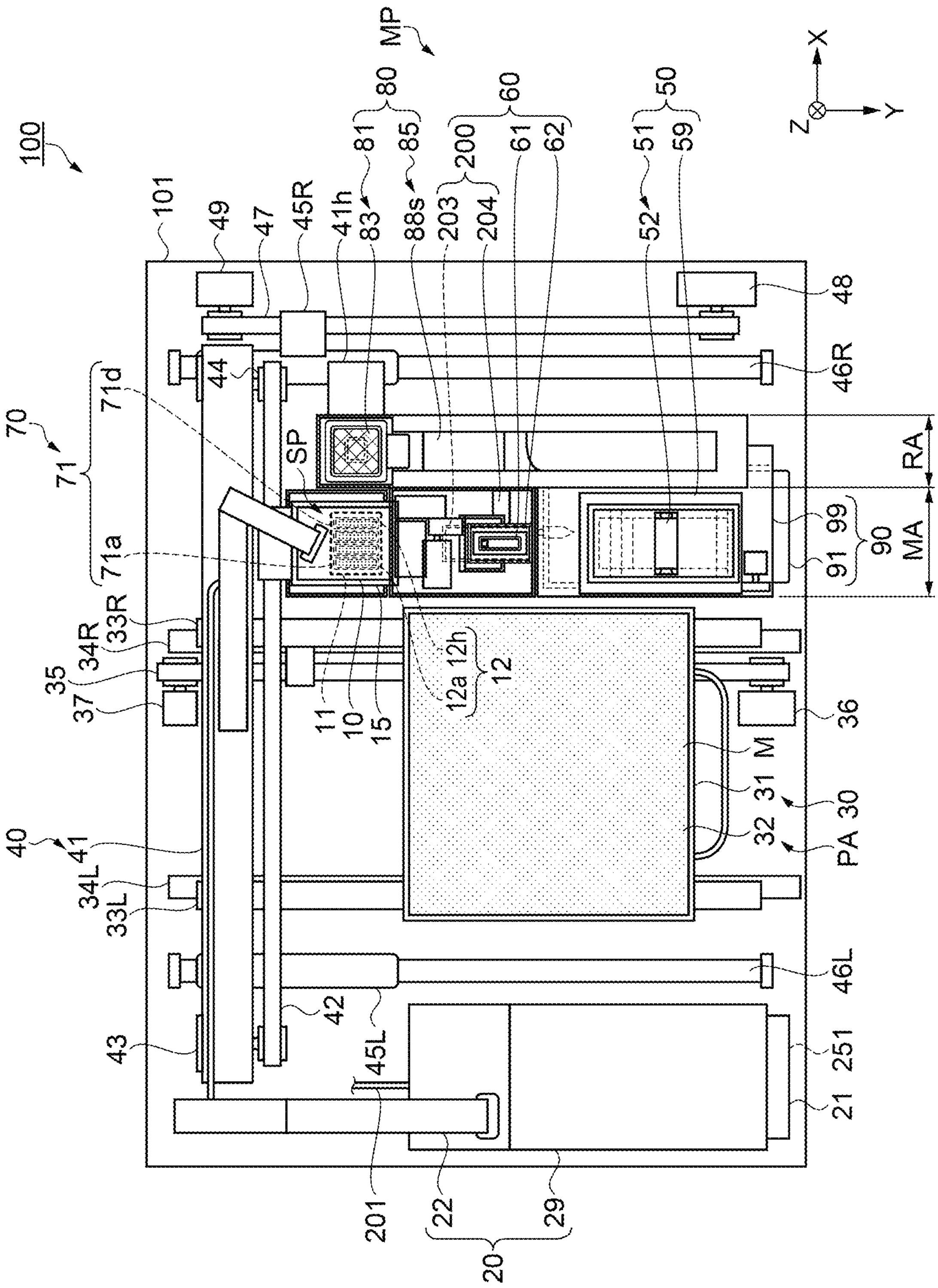
FIG. 3 is a schematic plan view illustrating the liquid ejection device in a state where a liquid ejection section is located at a standby position.

During non-printing times in which no printing operation is performed by the liquid ejection section 10, the liquid ejection device 100 performs standby capping by the standby section 70. In this case, the liquid ejection device 100 drives the ejection section movement mechanism 40 while the standby cap 71 is in the non-capping position. According to this, the liquid ejection device 100 moves the liquid ejection section 10 to a position where the nozzle arrays 12a to 12h are facing the standby caps 71a, 71b, 71c, 71d, as illustrated in FIG. 3.

Then, the standby cap 71 is moved from the non-capping position to the capping position by driving the standby cap raising and lowering mechanism 73. This forms four spaces in which the plurality of nozzles N comprising each nozzle array 12a to 12h open. The standby position SP of the carriage 15 and the liquid ejection section 10 during non-printing times is the position where standby capping is performed. Thus, the standby cap 71 is provided in the base section 101 at a position corresponding to the standby position SP where the liquid ejection section 10 stands by. In other words, during non-printing times, the carriage 15 and the liquid ejection section 10 are positioned at the standby position SP where the standby cap 71 of the standby section 70 can form a space in which the nozzles N open.

As illustrated in FIG. 1, the control section 300 has a central processing unit (CPU) 310 and a storage section 320. The CPU 310 can execute various programs stored in the storage section 320, and can make various decisions and execute various instructions. The storage section 320 stores, for example, various programs such as a program for performing maintenance of the liquid ejection section 10, various tables, and the like. The control section 300 controls the entire liquid ejection device 100.

For example, when washing the suction cap 61, the control section 300 drives the washing liquid supply section 202 while the suction cap 61 is in the non-capping position. By this, the control section 300 causes the washing liquid contained in the washing liquid container 251 to flow into the suction cap 61. The washing liquid flows into the suction cap 61 to wash the inside of the suction cap 61. Note that the position of the carriage 15 when washing the suction cap 61 is, for example, a position where the bottom surface of the carriage 15 faces the lip section of the suction cap 61.

If the supply of washing liquid into the suction cap 61 is continued, the washing liquid will overflow from the suction cap 61 through the lip section of the suction cap 61. The washing liquid overflows from the suction cap 61 while washing the lip section, and it is received in the washing liquid tray 203. The section 300 stops driving the washing liquid supply control section 202 after a predetermined amount of washing liquid is supplied toward the suction cap 61.

The washing liquid received by the washing liquid tray 203 is discharged through the washing liquid discharge flow path 204 to the outflow section 87 in the liquid receiving chamber 89 of the liquid tray 85. The washing liquid discharged to the outflow section 87 is stored in the outflow section 87. After performing the washing of the suction cap 61, the control section 300 controls the ejection section movement mechanism 40 to move the liquid ejection section 10 to the standby position SP. Then, the control section 300 controls the standby cap raising and lowering mechanism 73 to move the standby cap 71 from the non-capping position to the capping position to perform standby capping by the standby section 70.

When the liquid ejection section 10 is in the standby position SP, the discharge port 82d of the liquid receiving section 81 is located in the −Z direction from, that is, vertically above, the outflow section 87. Thus, when the liquid ejection section 10 is in the standby position SP, the ink discharged from the discharge port 82d of the liquid receiving section 81 falls toward the outflow section 87 of the liquid receiving chamber 89. In other words, in a state in which the washing liquid that flowed through the washing liquid discharge flow path 204 has accumulated in the outflow section 87 of the liquid receiving chamber 89, the liquid tray 85 receives ink discharged from the discharge port 82d of the liquid receiving section 81 in the outflow section 87 of the liquid receiving chamber 89.

Note that the time when the liquid ejection section 10 is in the standby position SP is longer than the time when the liquid ejection section 10 is in any of the positions different from the standby position SP. Thus, the time when the discharge port 82d of the liquid receiving section 81 is located vertically above the outflow section 87 is longer than the time when the discharge port 82d of the liquid receiving section 81 is located at any position of the tray bottom 88s of the liquid receiving chamber 89. Therefore, the amount of ink discharged from the discharge port 82d to the outflow section 87 is greater than the amount of ink discharged from the discharge port 82d to any of the tray bottom 88s of the liquid receiving chamber 89.

For example, when printing is performed on the medium M, the control section 300 controls the medium support mechanism 30 to move the medium support section 31 from the set position, on which the medium M is set, to the printing position, and then locates the medium M in the print area PA. Next, the control section 300 controls the standby section 70 to move the standby cap 71 from the capping position to the non-capping position to release standby capping.

Next, the control section 300 controls the ejection section movement mechanism 40 to move the liquid ejection section 10 from the standby position SP to a position where one of the nozzles N faces the medium M. Then, the control section 300 controls the ejection section movement mechanism 40 to repeatedly reciprocate the liquid ejection section 10 in the X axis direction and to move the liquid ejection section 10 in the +Y direction. As a result, the control section 300 performs printing by having the liquid ejection section 10 eject ink from the nozzles N onto the medium M.

When a predetermined time has elapsed during printing, for example, the control section 300 controls the ejection section movement mechanism 40 to move the liquid ejection section 10 to a position facing the liquid receiving section 81 of the liquid reception section 80. Then, the control section 300 performs flushing, which ejects ink from the nozzles N of the liquid ejection section 10 toward the liquid receiving section 81.

When performing maintenance on the liquid ejection section 10, the control section 300 controls the ejection section movement mechanism 40 while the suction cap 61 is in the non-capping position. The control section 300 moves the liquid ejection section 10 to a position where one of the nozzle arrays 12*a* to 12*h* faces the suction cap 61. Then, the control section 300 controls the cleaning section drive mechanism 63 to move the suction cap 61 to the suction-capable position, and to cause the suction pump 65 to perform the suction operation. Then, the control section 300 controls the cleaning section drive mechanism 63 to move the suction cap 61 from the suction-capable position to the non-capping position.

Next, the control section 300 controls the wiping section drive mechanism 57 to move the wiping body 51 to the wipeable position. Then, the control section 300 controls the ejection section movement mechanism 40 to move the liquid ejection section 10 to a position on the −Y direction side of the strip-shaped member 52. Further, the control section 300 moves the liquid ejection section 10 in the +Y direction to wipe the nozzle surface 11 by the wiping section 50.

Next, the control section 300 controls the ejection section movement mechanism 40 to move the liquid ejection section 10 to a position facing the liquid receiving section 81 of the liquid reception section 80, and to perform flushing to eject ink from the nozzle N of the liquid ejection section 10. When the maintenance of the liquid ejection section 10 is finished, the control section 300 controls the ejection section movement mechanism 40 to move the liquid ejection section 10 to the standby position SP. Then, the control section 300 controls the standby cap raising and lowering mechanism 73 to move the standby cap 71 from the non-capping position to the capping position to perform standby capping by the standby section 70.

As described above, the liquid ejection device 100 according to the first embodiment can achieve the following effects.

The liquid ejection device 100 is equipped with a base section 101 and a liquid ejection section 10 that performs printing by ejecting ink onto a medium M from nozzles N. The liquid ejection device 100 is equipped with an ejection section movement mechanism 40 provided on the base section 101, which holds the liquid ejection section 10 that is movable in the Y axis direction and the X axis direction that intersects the Y axis direction, of the base section 101. The liquid ejection device 100 is further equipped with a medium support section 31, which is provided on the base section 101 and supports the medium M in a print area PA where the liquid ejection section 10 performs printing. The liquid ejection device 100 is further equipped with a liquid receiving section 81, which is movable across the Y axis direction of the print area PA and is provided in the ejection section movement mechanism 40, and which has an absorbing member 83 that receives ink ejected as waste liquid from the nozzles N. The liquid ejection device 100 is further equipped with a liquid tray 85, which is provided below the liquid receiving section 81 and receives the ink discharged from the liquid receiving section 81. The liquid receiving section 81 is provided at a position that is below the liquid ejection section 10 as viewed from the direction along the X axis direction, and the liquid tray 85 is provided spanning the Y axis direction of the movement area RA where the liquid receiving section 81 moves. According to this, since the liquid receiving section 81 is provided to be movable in the Y axis direction together with the liquid ejection section 10, regions with more ink ejected into the liquid receiving section 81 and regions with less ink ejected into the liquid receiving section 81 are less likely to occur in the absorbing member 83. Therefore, the ink ejected into the liquid receiving section 81 is less likely to dry and thicken or solidify in the absorbing member 83, and the liquid receiving section 81 can properly receive the ink ejected by flushing.

The liquid ejection device 100 is equipped with a standby cap 71 that can form a space in which the nozzles N open, in the base section 101. The standby cap 71 is provided at a position between the print area PA and the movement area RA in the X axis direction. This suppresses the adhesion of mist, which is generated by the flushing performed toward the liquid receiving section 81, to the print area PA.

The liquid ejection device 100 is equipped with a second waste liquid tube 69 that connects the liquid tray 85 to the waste liquid container 91 that can contain ink received by the liquid tray 85. The liquid ejection device 100 is further equipped with a second suction section 65B, which is provided in the second waste liquid tube 69 and causes the ink to flow from the liquid tray 85 toward the waste liquid container 91. This enables the ink received in the liquid tray 85 to be discharged toward the waste liquid container 91.

The liquid ejection device 100 is equipped with a suction cap 61 that can form a space in which the nozzles N open, in the base section 101. The liquid ejection device 100 is also equipped with a washing liquid discharge flow path 204 that discharges washing liquid for washing the suction cap 61 and that discharges washing liquid that overflowed from the suction cap 61. The liquid tray 85 receives the washing liquid discharged from the washing liquid discharge flow path 204. This enables the washing liquid that washed the suction cap 61 to flow into the liquid tray 85. Therefore, ink accumulation in the liquid tray 85 can be suppressed.

The liquid tray 85 receives ink discharged from the liquid receiving section 81 while holding washing liquid that flowed in via the washing liquid discharge flow path 204. This can suppress the accumulation of ink discharged from the liquid receiving section 81 in the liquid tray 85.

The liquid ejection device 100 in the above embodiment in this disclosure is based on the configurations described above, but it is of course possible to change or omit portions of the configuration to the extent that it does not depart from the gist of the present disclosure. In addition, the above embodiments and other embodiments described below can be implemented in combination with each other within a range that does not technically conflict. Other embodiments will be described below.

In the above embodiment, the liquid receiving chamber 89 may not have the partition wall 88*p*. The tray bottom surface 88*s*, which constitutes the bottom surface 88 of the liquid receiving chamber 89, may be sloped toward the +Z direction from the +Y direction end portion of the liquid receiving chamber 89 toward the outflow port 87*p* on the −Y direction side of the liquid receiving chamber 89. In this case, the tray bottom surface 88*s* is an example of a slope section. In this case, the tray bottom surface 88*s* can be said to slope in the +Z direction with respect to the Y axis direction from the +Y direction end of the liquid receiving chamber 89 toward the standby position SP, which is on the −Y direction side.

Figure 16:
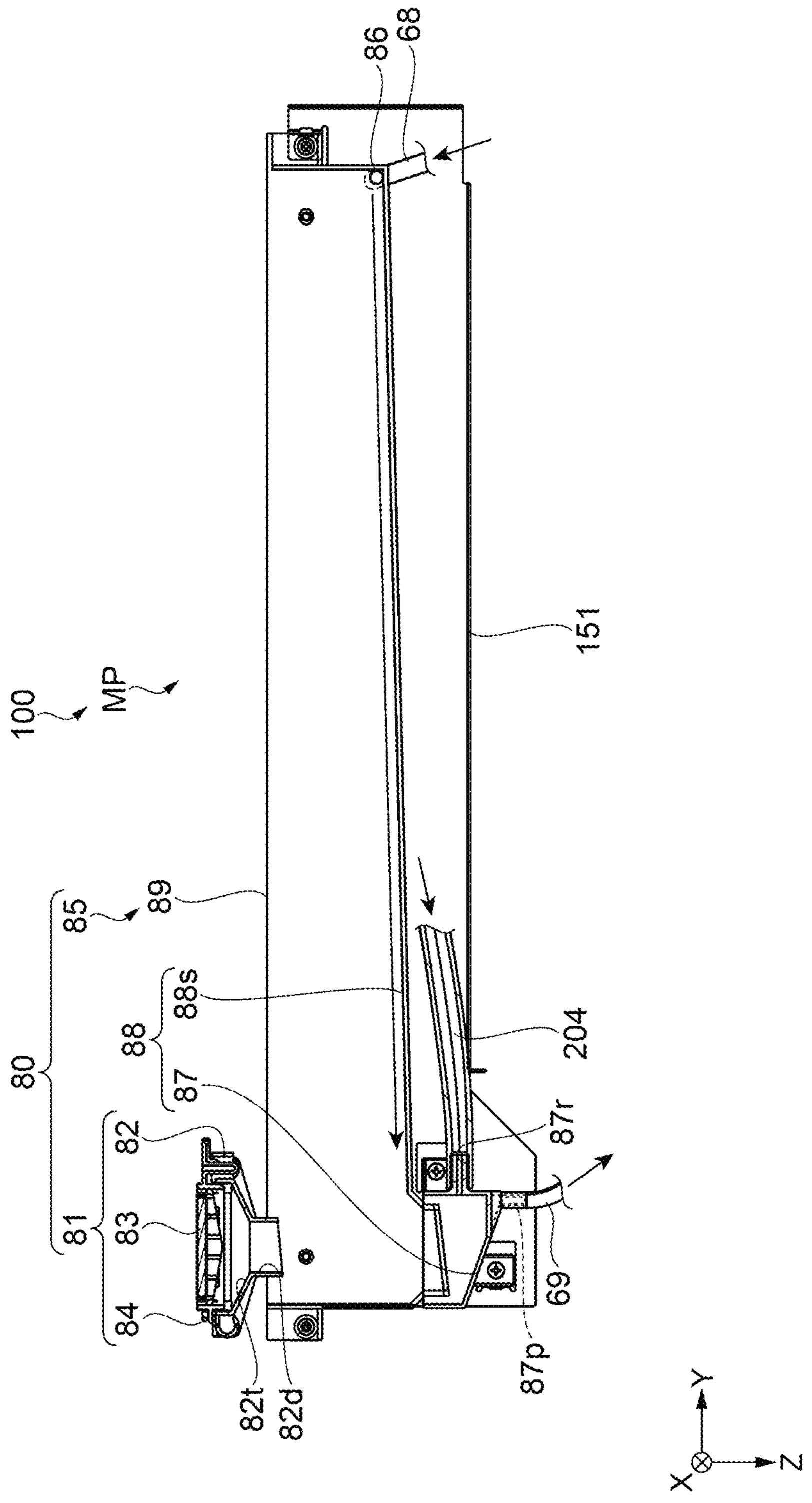
FIG. 16 is a schematic sectional view showing another embodiment of a liquid tray.

In this case, the liquid ejection device 100 may cause the ink received by the suction cap 61 as waste liquid or the washing liquid supplied to the suction cap 61 to flow into the liquid receiving chamber 89. For example, as illustrated FIG. 16, the liquid receiving chamber 89 is provided with an inflow port 86 that allows ink to flow into the liquid receiving chamber 89 through the first waste liquid tube 68. The inflow port 86 is located between the +Y direction end of the tray bottom surface 88*s* and the outflow section 87 in the Y axis direction, and is located on the +X direction side wall of the liquid tray 85. Thus, as shown by the arrow in FIG. 16, the ink flowing from the inflow port 86 into the liquid receiving chamber 89 flows along the tray bottom surface 88*s* toward the outflow section 87. The inflow port 86 is located further in the −Z direction than the outflow section 87 in the Z axis direction. In this case, the joint 95 connects the second waste liquid tube 69 to the third waste liquid tube 96, which is connected to the discharge tube 97 of the waste liquid container mounting section 99. The suction cap 61 communicates with the waste liquid container 91 through the first waste liquid tube 68, the liquid receiving chamber 89, the second waste liquid tube 69, the joint 95, the third waste liquid tube 96, and the discharge tube 97.

According to the liquid ejection device 100 equipped with the tray bottom surface 88*s*, which is an example of the slope section described above, the following effects can be obtained. The liquid tray 85 provided in the liquid ejection device 100 has an outflow port 87*p* for discharging ink received from the liquid receiving section 81 and a bottom surface 88 extending in the Y axis direction. The bottom surface 88 has the tray bottom surface 88*s* that slopes downward toward the outflow port 87*p*. According to this, the ink received in the liquid tray 85 can be appropriately discharged from the liquid tray 85.

Further, the liquid ejection device 100 is equipped with a standby cap 71 on the base section 101 that can form a space in which the nozzles N open. The standby cap 71 is provided on the base section 101 at a position corresponding to a standby position SP where the liquid ejection section 10 stands by. The tray bottom surface 88*s* then slopes downward toward the standby position SP in the Y axis direction. According to this, more ink is discharged into the liquid tray 85 on the side closer to the standby cap 71, so that the ink to be received in the liquid tray 85 can be efficiently discharged from the liquid tray 85.

In addition, the liquid ejection device 100 is equipped with the suction cap 61 that can form a space in which the nozzles N open, and that receives ink discharged from the nozzles N as waste liquid in cleaning. The liquid tray 85 receives ink discharged from the suction cap 61. According to this, since the ink discharged by the suction cleaning can be allowed to flow in the liquid tray 85. Thus, ink accumulation in the liquid tray 85 can be suppressed.

In the above embodiment, the tray bottom surface 88*s* may be located at a position between the washing liquid tray 203 and the outflow section 87 in the Z axis direction. As a result, the tray bottom surface 88*s* is located further in the +Z direction than the washing liquid tray 203. In addition, the tray bottom surface 88*s* is located further in the −Z direction than the outflow section 87. The washing liquid discharged into the outflow section 87 during washing of the suction cap 61 may then be stored in the liquid receiving chamber 89, which includes the outflow section 87 and the tray bottom surface 88*s*. In this case, the ink discharged from the discharge port 82*d* of the liquid receiving section 81 falls toward the washing liquid stored in the liquid receiving chamber 89. In other words, while holding the washing liquid that flows into the liquid receiving chamber 89 through the washing liquid discharge flow path 204, the liquid tray 85 receives ink that was discharged from the discharge port 82*d* of the liquid receiving section 81 in the liquid receiving chamber 89.

In the above embodiment, the liquid reception section 80 need not be located on the +X direction side of the maintenance area MA in the X axis direction. For example, the liquid reception section 80 may be located between the print area PA and the maintenance area MA in the X axis direction. In this case, the movement area RA is an area between the print area PA and the maintenance area MA in the X axis direction.

In the above embodiment, the standby section 70 may not be provided at a position between the print area PA and the movement area RA in the X axis direction. For example, the standby section 70 may be located at a position that overlaps the print area PA in the X axis direction.

In the above embodiment, the standby section 70, the cleaning section 60, and the wiping section 50 need not be located in the order of the standby section 70, the cleaning section 60, and the wiping section 50 from the −Y direction side toward the +Y direction side in the Y axis direction. For example, the standby section 70, the cleaning section 60, and the wiping section 50 may be located in the order of the cleaning section 60, the standby section 70, and the wiping section 50 from the −Y direction side to the +Y direction side in the Y axis direction.

In the above embodiment, the wiping body 51 does not need to be equipped with the strip-shaped member 52 as long as the wiping body 51 can wipe the nozzle surface 11 of the liquid ejection section 10. For example, the wiping body 51 may be equipped with a reed shape elastomer member as a wiping member in an orientation with the Y axis direction as the thickness direction.

In the above embodiment, the wiping body 51 cannot be detachable from the −Z direction. For example, the wiping body 51 may be provided so as to be detachable from the front surface 103 of the outer member 102 on the +Y direction side in the Y axis direction.

In the above embodiment, the wiping body 51 need not be detachable. In this case, the wiping body mounting section 59 may be omitted. In this case, for example, the standby section 70, the cleaning section 60, and the wiping section 50 may be located in the order of the wiping section 50, the standby section 70, and the cleaning section 60 from the −Y direction side to the +Y direction side in the Y axis direction. In this case, the wiping body 51 does not need to overlap with the waste liquid container mounting section 99, as viewed from the direction along the Z axis direction.

In the above embodiment, the waste liquid container 91 cannot be detachable. In this case, the waste liquid container mounting section 99 may be omitted.

In the above embodiment, the liquid ejection device 100 may be equipped with a washing liquid container mounting section, in addition to the liquid container mounting section 29, in which the washing liquid container 251 can be attached to and detached from. In this case, the liquid container mounting section 29 does not need to have a mounting slot where the washing liquid container 251 can be attached to and detached from.

In the above embodiment, the washing liquid container 251 need not be detachable. In this case, the liquid container mounting section 29 does not need to have a mounting slot where the washing liquid container 251 can be attached to and detached from.

In the above embodiment, a leakage liquid receiving section may be provided. The leakage liquid receiving section is located below connection sections between the plurality of liquid containers 21, which are mounted in the liquid container mounting section 29, and the supply flow path 22, and receives ink that leaks from the connection sections. Then, a leakage liquid accommodation section may be provided below the liquid container mounting section 29 to contain the leakage ink, and a conduit may be provided to guide the ink received by the leakage liquid receiving sections, which are provided in the mounting slots, to the leakage liquid accommodation section. In this case, the positions of the mounting slots are set so that among the plurality of liquid containers 21, a liquid container 21 that holds ink that easily solidifies is lower than a liquid container 21 that holds ink that does not solidify easily. According to this, delay of collection of ink that was received in the liquid leakage receiving section into the liquid leakage accommodation section caused by ink solidification in the conduit can be suppressed.

In the above embodiment, the cap washing section 200 may be capable of washing the standby cap 71. In this case, the cap washing section 200 may be equipped with an unshown washing liquid supply flow path SC1, a washing liquid tray SC3, and a washing liquid discharge flow path SC4. The washing liquid supplying flow path SC1 connects the washing liquid supply section 202 to the standby caps 71*a*, 71*b*, 71*c*, 71*d*. The washing liquid tray SC3 is located at the +Z direction side of the standby caps 71*a*, 71*b*, 71*c*, 71*d*. The washing liquid tray SC3 receives washing liquid that is supplied to the standby caps 71*a*, 71*b*, 71*c*, 71*d* and that overflows from the standby caps 71*a*, 71*b*, 71*c*, 71*d*. The washing liquid discharge flow path SC4 connects the washing liquid tray SC3 to the liquid tray 85 so that the washing liquid overflowing from the standby caps 71*a*, 71*b*, 71*c*, 71*d* can be discharged from the washing liquid tray SC3. According to this, the standby caps 71*a*, 71*b*, 71*c*, 71*d* can be washed with the washing liquid. In addition, the washing liquid that has washed the standby caps 71*a*, 71*b*, 71*c*, 71*d* can flow into the liquid tray 85. Therefore, ink accumulation in the liquid tray 85 can be suppressed.

In addition, in this case, the liquid tray 85 receives the ink which is discharged from the liquid receiving section 81 while holding washing liquid inflow through the washing liquid discharge flow path SC4. This can suppress the accumulation of ink discharged from the liquid receiving section 81 in the liquid tray 85.

What is claimed is:

1. A liquid ejection device comprising:
- a base section;
- a liquid ejection section that performs printing by ejecting liquid from nozzles onto a medium;
- a liquid receiving section having an absorbing member that receives liquid that was ejected as waste liquid from the nozzles;
- an ejection section movement mechanism that is provided in the base section, and that movably holds the liquid ejection section and the liquid receiving section;
- a medium support section that is provided on the base section, and that supports the medium in a print area where the liquid ejection section performs printing; and
- a liquid tray that is provided below the liquid receiving section, and that is configured to receive liquid discharged from the liquid receiving section, wherein
- the ejection section movement mechanism is configured to move the liquid ejection section and the liquid receiving section across a depth direction of the print area, and to move the liquid ejection section in a scanning direction that intersects the depth direction,
- the liquid receiving section is provided at a position below the liquid ejection section as viewed from a direction along the scanning direction, and
- the liquid tray is provided spanning the depth direction of a movement area in which the liquid receiving section moves.

2. The liquid ejection device according to claim 1, further comprising:
- a standby cap that is provided on the base section and that is configured to form a space in which the nozzles open, wherein
- the standby cap is provided at a position between the print area and the movement area in the scanning direction.

3. The liquid ejection device according to claim 2, further comprising:
- an outflow flow path that connects the liquid tray to a waste liquid container that is configured to contain liquid received by the liquid tray; and
- an outflow pump that is provided in the outflow flow path to cause the liquid to flow from the liquid tray toward the waste liquid container.

4. The liquid ejection device according to claim 2, further comprising:
- a suction cap that is configured to form a space in which the nozzles open and that receives the liquid discharged from the nozzles as waste liquid in cleaning, wherein
- the liquid tray receives liquid that is discharged from the suction cap.

5. The liquid ejection device according to claim 1, further comprising:
- an outflow flow path that connects the liquid tray to a waste liquid container that is configured to contain liquid received by the liquid tray; and
- an outflow pump that is provided in the outflow flow path to cause the liquid to flow from the liquid tray toward the waste liquid container.

6. The liquid ejection device according to claim 1, further comprising:
- a cap that is provided on the base section and that is configured to form a space in which the nozzles open and
- a washing liquid discharge flow path that discharges washing liquid for washing the cap and that discharges washing liquid that overflows from the cap, wherein
- the liquid tray receives the washing liquid that is discharged from the washing liquid discharge flow path.

7. The liquid ejection device according to claim 6, wherein
- the liquid tray receives liquid discharged from the liquid receiving section while storing the washing liquid that inflows through the washing liquid discharge flow path.

8. The liquid ejection device according to claim 1, wherein
- the liquid tray has an outflow port through which the liquid received from the liquid receiving section is discharged and a bottom surface that extends in the depth direction, and
- the bottom surface has a slope section that slopes downward toward the outflow port.

9. The liquid ejection device according to claim 8, further comprising:
- a standby cap that is provided on the base section and that is configured to form a space in which the nozzles open, wherein
- the standby cap is provided at a position in the base section corresponding to a standby position where the liquid ejection section stands by and
- the slope section slopes downward toward the standby position in the depth direction.

10. The liquid ejection device according to claim 1, further comprising:
- a suction cap that is configured to form a space in which the nozzles open and that receives the liquid discharged from the nozzles as waste liquid in cleaning, wherein the liquid tray receives liquid that is discharged from the suction cap.

* * * * *